United States Patent
Tiyyagura et al.

(10) Patent No.: US 11,837,005 B2
(45) Date of Patent: *Dec. 5, 2023

(54) MACHINE LEARNING BASED END-TO-END EXTRACTION OF TABLES FROM ELECTRONIC DOCUMENTS

(71) Applicant: EYGS LLP, London (GB)

(72) Inventors: Sunil Reddy Tiyyagura, Bengaluru (IN); Amani Kongara, Bengaluru (IN)

(73) Assignee: EYGS LLP, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,461

(22) Filed: Feb. 22, 2023

(65) Prior Publication Data

US 2023/0237828 A1    Jul. 27, 2023

Related U.S. Application Data

(63) Continuation of application No. 16/781,195, filed on Feb. 4, 2020, now Pat. No. 11,625,934.

(51) Int. Cl.
    *G06V 30/414* (2022.01)
    *G06F 40/295* (2020.01)
    *G06V 30/10* (2022.01)

(52) U.S. Cl.
    CPC .......... *G06V 30/414* (2022.01); *G06F 40/295* (2020.01); *G06V 30/10* (2022.01)

(58) Field of Classification Search
    None
    See application file for complete search history.

(56) References Cited

U.S. PATENT DOCUMENTS

| 5,048,107 A | 9/1991 | Tachikawa |
| 5,848,186 A | 12/1998 | Wang et al. |

(Continued)

FOREIGN PATENT DOCUMENTS

| AU | 2018237196 A1 | 10/2019 |
| EP | 2154631 A2 | 2/2010 |

(Continued)

OTHER PUBLICATIONS

Deivalakshmi, S., K. Chaitanya, and P. Palanisamy. "Detection of table structure and content extraction from scanned documents." In 2014 International Conference on Communication and Signal Processing, pp. 270-274. IEEE, 2014. (Year: 2014).*

(Continued)

*Primary Examiner* — Frank D Mills
(74) *Attorney, Agent, or Firm* — COOLEY LLP

(57) ABSTRACT

In some embodiments, a method includes identifying a set of word bounding boxes in a first electronic document, and identifying locations of horizontal white space between two adjacent rows from a set of rows in a table. The method includes determining, using a Natural Language Processing algorithm, an entity name from a set of entity names for each table cell from a set of table cells in the table. The method includes determining, using a machine learning algorithm a class from a set of classes for each row from the set of rows. The method includes extracting a set of table cell values associated with the set of table cells, and generating a second electronic document including the set of table cell values arranged in the set of rows and the set of columns such that the set of words in the table are computer-readable in the second electronic document.

20 Claims, 31 Drawing Sheets

(56) References Cited

U.S. PATENT DOCUMENTS

| | | | |
|---|---|---|---|
| 5,892,843 A | 4/1999 | Zhou et al. | |
| 6,006,240 A | 12/1999 | Handley | |
| 6,735,748 B1 | 5/2004 | Teig et al. | |
| 6,757,870 B1 | 6/2004 | Stinger | |
| 7,283,683 B1 | 10/2007 | Nakamura et al. | |
| 7,548,847 B2 | 6/2009 | Acero et al. | |
| 8,165,974 B2 | 4/2012 | Privault et al. | |
| 8,731,300 B2 | 5/2014 | Rodriguez Serrano et al. | |
| 9,058,536 B1 | 6/2015 | Yuan et al. | |
| 9,172,842 B2 | 10/2015 | Booth et al. | |
| 9,235,812 B2 | 1/2016 | Scholtes | |
| 9,269,053 B2 | 2/2016 | Naslund et al. | |
| 9,342,892 B2 | 5/2016 | Booth et al. | |
| 9,348,815 B1 | 5/2016 | Estes et al. | |
| 9,703,766 B1* | 7/2017 | Kyre | G06F 40/131 |
| 9,875,736 B2 | 1/2018 | Kim et al. | |
| 10,002,129 B1 | 6/2018 | D'Souza | |
| 10,062,039 B1 | 8/2018 | Lockett | |
| 10,241,992 B1* | 3/2019 | Middendorf | G06F 40/177 |
| 10,614,345 B1 | 4/2020 | Tecuci et al. | |
| 10,810,709 B1* | 10/2020 | Tiyyagura | G06T 5/002 |
| 10,956,786 B2 | 3/2021 | Tecuci et al. | |
| 11,106,906 B2* | 8/2021 | Bassu | G06F 40/14 |
| 11,113,518 B2* | 9/2021 | Chua | G06V 30/414 |
| 11,625,934 B2 | 4/2023 | Tiyyagura et al. | |
| 2003/0097384 A1 | 5/2003 | Hu et al. | |
| 2006/0288268 A1 | 12/2006 | Srinivasan et al. | |
| 2007/0041642 A1 | 2/2007 | Romanoff et al. | |
| 2007/0050411 A1 | 3/2007 | Hull et al. | |
| 2010/0174975 A1 | 7/2010 | Mansfield et al. | |
| 2011/0249905 A1 | 10/2011 | Singh et al. | |
| 2012/0072859 A1 | 3/2012 | Wang et al. | |
| 2013/0191715 A1 | 7/2013 | Raskovic et al. | |
| 2014/0223284 A1 | 8/2014 | Rankin, Jr. et al. | |
| 2015/0058374 A1 | 2/2015 | Golubev et al. | |
| 2015/0093021 A1 | 4/2015 | Xu et al. | |
| 2015/0356461 A1 | 12/2015 | Vinyals et al. | |
| 2016/0078364 A1 | 3/2016 | Chiu et al. | |
| 2016/0104077 A1 | 4/2016 | Jackson, Jr. et al. | |
| 2016/0162456 A1 | 6/2016 | Munro et al. | |
| 2016/0350280 A1 | 12/2016 | Lavallee et al. | |
| 2016/0364608 A1 | 12/2016 | Sengupta et al. | |
| 2017/0083829 A1 | 3/2017 | Kang et al. | |
| 2017/0177180 A1 | 6/2017 | Bachmann et al. | |
| 2017/0235848 A1 | 8/2017 | Van Dusen et al. | |
| 2017/0300472 A1 | 10/2017 | Parikh et al. | |
| 2017/0300565 A1* | 10/2017 | Calapodescu | G06F 16/353 |
| 2018/0060303 A1 | 3/2018 | Sarikaya et al. | |
| 2018/0068232 A1 | 3/2018 | Hari Haran et al. | |
| 2018/0129634 A1 | 5/2018 | Sivaji et al. | |
| 2018/0157723 A1 | 6/2018 | Chougule et al. | |
| 2018/0181797 A1 | 6/2018 | Han et al. | |
| 2018/0203674 A1 | 7/2018 | Dayanandan | |
| 2018/0204360 A1 | 7/2018 | Bekas et al. | |
| 2018/0336404 A1* | 11/2018 | Hosabettu | G06V 30/412 |
| 2019/0050381 A1 | 2/2019 | Agrawal et al. | |
| 2019/0108448 A1 | 4/2019 | O'Malia et al. | |
| 2019/0147320 A1 | 5/2019 | Mattyus et al. | |
| 2019/0171704 A1 | 6/2019 | Buisson et al. | |
| 2019/0228495 A1 | 7/2019 | Tremblay et al. | |
| 2019/0266394 A1* | 8/2019 | Yu | G06V 30/413 |
| 2019/0303663 A1* | 10/2019 | Krishnapura Subbaraya | G06V 30/413 |
| 2019/0340240 A1* | 11/2019 | Duta | G06V 30/15 |
| 2020/0005033 A1* | 1/2020 | Bellert | G06F 16/93 |
| 2020/0073878 A1* | 3/2020 | Mukhopadhyay | G06V 30/412 |
| 2020/0089946 A1* | 3/2020 | Mallick | G06V 30/416 |
| 2020/0151444 A1* | 5/2020 | Price | G06V 30/416 |
| 2020/0151559 A1 | 5/2020 | Karras et al. | |
| 2020/0175267 A1* | 6/2020 | Schäfer | G06V 30/413 |
| 2020/0250139 A1* | 8/2020 | Muffat | G06V 30/1988 |
| 2020/0250513 A1 | 8/2020 | Krishnamoorthy | |
| 2020/0265224 A1* | 8/2020 | Gurav | G06V 30/414 |
| 2020/0327373 A1 | 10/2020 | Tecuci et al. | |
| 2020/0410231 A1 | 12/2020 | Chua et al. | |
| 2021/0056429 A1 | 2/2021 | Gangeh et al. | |
| 2021/0064861 A1* | 3/2021 | Semenov | G06V 30/413 |
| 2021/0064908 A1* | 3/2021 | Semenov | G06V 30/413 |
| 2021/0073325 A1* | 3/2021 | Angst | G06F 16/93 |
| 2021/0073326 A1* | 3/2021 | Aggarwal | G06F 40/103 |
| 2021/0117668 A1* | 4/2021 | Zhong | G06N 3/044 |
| 2021/0150338 A1* | 5/2021 | Semenov | G06N 20/10 |
| 2021/0150757 A1 | 5/2021 | Mustikovela et al. | |
| 2021/0165938 A1 | 6/2021 | Bailey et al. | |
| 2021/0166016 A1* | 6/2021 | Sun | G06Q 30/0627 |
| 2021/0166074 A1 | 6/2021 | Tecuci et al. | |
| 2021/0233656 A1 | 7/2021 | Tran et al. | |
| 2021/0240976 A1 | 8/2021 | Tiyyagura et al. | |
| 2021/0365678 A1 | 11/2021 | Chua et al. | |
| 2022/0027740 A1 | 1/2022 | Dong et al. | |
| 2022/0058839 A1 | 2/2022 | Chang et al. | |
| 2022/0148242 A1 | 5/2022 | Russell et al. | |

FOREIGN PATENT DOCUMENTS

| | | |
|---|---|---|
| EP | 3742346 A2 | 11/2020 |
| WO | WO-2017163230 A1 | 9/2017 |
| WO | WO-2018175686 A1 | 9/2018 |

OTHER PUBLICATIONS

Babatunde, F. F. et al., "Automatic Table Recognition and Extraction from Heterogeneous Documents," Journal of Computer and Communications, vol. 3, pp. 100-110 (Dec. 2015).

Dong, C. et al., "Image Super-Resolution Using Deep Convolutional Networks," arXiv:1501.00092v3 [cs.CV], Jul. 31, 2015, Retrieved from the Internet: URL: https://arxiv.org/pdf/1501.00092.pdf, 14 pages.

Dong, R. et al., "Multi-input attention for unsupervised OCR correction," Proceedings of the 56th Annual Meetings of the Association for Computational Linguistics (Long Papers), Melbourne, Australia, Jul. 15-20, 2018, pp. 2363-2372.

Eskenazi, S. et al., A comprehensive survey of mostly textual document segmentation algorithms since 2008, Pattern Recognition, vol. 64, Apr. 2017, pp. 1-14.

Fan, M. et al., "Detecting Table Region in PDF Documents Using Distant Supervision," arXiv:1506.08891v6 [cs.CV], Sep. 22, 2015, Retrieved from the Internet: URL: https://arxiv.org/pdf/1506.08891v6.pdf, 7 pages.

Gangeh, M. J. et al., "Document enhancement system using autoencoders," 33rd Conference on Neural Information Processing Systems (NeurIPS 2019), Vancouver, Canada, Nov. 2019, Retrieved from the Internet:: URL:https://openreview.net/pdf?id=S1Mnzp9qLB, 4 pages.

Hakim, S. M. A. et al., "Handwritten bangla numeral and basic character recognition using deep convolutional neural network," 2019 International Conference on Electrical, Computer and Communication Engineering (ECCE), IEEE, Feb. 7-9, 2019, 6 pages.

Handley, J. C., "Table analysis for multi-line cell identification," Proceedings of SPIE, vol. 4307, Jan. 2001, pp. 34-43.

Hanifah, L. et al., "Table Extraction from Web Pages Using Conditional Random Fields to Extract Toponym Related Data," Journal of Physics: Conference Series, vol. 801, Issue 1, Article ID 012064, Jan. 2017, 8 pages.

Harit, G. et al., "Table Detection in Document Images using Header and Trailer Patterns," ICVGIP '12, Dec. 16-19, 2012, Mumbai, India, 8 pages.

Howard, J. et al., "Universal Language Model Fine-tuning for Text Classification," arXiv:1801.06146v5 [cs.CL], May 23, 2018, Retrieved from the Internet: URL: https://arxiv.org/pdf/1801.06146.pdf, 12 pages.

International Search Report and Written Opinion for International Application No. PCT/EP2020/076042, dated Jan. 12, 2021, 11 pages.

International Search Report and Written Opinion for International Application No. PCT/EP2021/052579, dated May 10, 2021, 15 pages.

(56) References Cited

OTHER PUBLICATIONS

International Search Report and Written Opinion for International Application No. PCT/US2020/027916, dated Jul. 21, 2020, 16 pages.
International Search Report and Written Opinion for International Application No. PCT/US2020/039611, dated Oct. 13, 2020, 12 pages.
International Search Report and Written Opinion for International Application No. PCT/US2020/046820, dated Nov. 11, 2020, 13 pages.
Isola, P. et al., "Image-to-Image Translation with Conditional Adversarial Networks," arXiv:1611.07004v3 [cs.CV] Nov. 26, 2018, Retrieved from the Internet: URL: https://arxiv.org/pdf/1611.07004.pdf, 17 pages.
Kasar, T. et al., "Learning to Detect Tables in Scanned Document Images Using Line Information," ICDAR '13: Proceedings of the 2013 12th International Conference on Document Analysis and Recognition, Aug. 2013, Washington, DC, pp. 1185-1189.
Kavasidis, I. et al., "A Saliency-based Convolutional Neural Network for Table and Chart Detection in Digitized Documents," arXiv.1804.06236v1 [cs.CV], Apr. 17, 2018, Retrieved from the Internet: URL: https://arxiv.org/pdf/1804.06236.pdf, 13 pages.
Kharb, L. et al., "Embedding Intelligence through Cognitive Services," International Journal for Research in Applied Science & Engineering Technology (IJRASET), ISSN: 2321-9653; IC Value: 45.98; SJ Impact Factor:6.887, vol. 5, Issue XI, Nov. 2017, pp. 533-537.
Kise, K. et al., "Segmentation of Page Images Using the Area Voronoi Diagram," Computer Vision and Image Understanding, vol. 70, No. 3, Jun. 1998, pp. 370-382.
Klampfl, S. et al., "A Comparison of Two Unsupervised Table Recognition Methods from Digital Scientific Articles," D-Lib Magazine, vol. 20, No. 11/12, Nov./Dec. 2014, DOI:10.1045/november14-klampfl, 15 pages.
Le Vine, N. et al., "Extracting tables from documents using conditional generative adversarial networks and genetic algorithms," IJCNN 2019 International Joint Conference on Neural Networks, Budapest, Hungary, Jul. 14-19, 2019, pp. 1-8.
Lehtinen, J. et al., "Noise2Noise: Learning Image Restoration without Clean Data," Proceedings of the 35th International Conference on Machine Learning, Stockholm, Sweden, PMLR 80, Jul. 10-15, 2018, Retrieved from the Internet: URL: http://proceedings.mlr.press/v80/lehtinen18a/lehtinen18a.pdf, 10 pages.
Li, Y. et al., "A GAN-based Feature Generator for Table Detection," 2019 International Conference on Document Analysis and Recognition (ICDAR), Conference Paper, IEEE (2019), 6 pages.
Mac, A. J. et al., "Locating tables in scanned documents for reconstructing and republishing," arXiv:1412.7689 [cs.CV], Dec. 2014, The 7th International Conference on Information and Automation for Sustainability (ICIAfS) 2014, 6 pages.
Mao, X-J. et al., "Image Restoration Using Convolutional Autoencoders with Symmetric Skip Connections," arXiv:1606.08921v3 [cs.CV], Aug. 30, 2016, Retrieved from the Internet: URL: https://arxiv.org/abs/1606.08921, 17 pages.
Mao, X-J. et al., "Image Restoration Using Very Deep Convolutional Encoder-Decoder Networks with Symmetric Skip Connections," 30th Conference on Neural Information Processing Systems (NIPS 2016), Barcelona, Spain, Retrieved from the Internet: URL: https://papers.nips.cc/paper/6172-image-restoration-using-very-deep-convolutional-encoder-decoder-networks-with-symmetric-skip-connections.pdf, 9 pages.
Notice of Allowance for U.S. Appl. No. 16/781,195, dated Feb. 1, 2023, 10 pages.
Office Action for U.S. Appl. No. 16/382,707, dated Sep. 4, 2019, 11 pages.
Office Action for U.S. Appl. No. 16/456,832, dated Nov. 6, 2020, 18 pages.
Office Action for U.S. Appl. No. 16/546,938, dated May 27, 2022, 11 pages.
Office Action for U.S. Appl. No. 16/781,195, dated Jun. 8, 2022, 29 pages.
Office Action for U.S. Appl. No. 16/781,195, dated Nov. 26, 2021, 26 pages.
Office Action for U.S. Appl. No. 16/790,945, dated Jul. 29, 2020, 13 pages.
Ohta, M. et al., "A cell-detection-based table-structure recognition method," Proceedings of the ACM Symposium on Document Engineering 2019, pp. 1-4.
Oliveira, H. et al., "Assessing shallow sentence scoring techniques and combinations for single and multi-document summarization," Expert Systems With Applications, vol. 65 (Dec. 2016) pp. 68-86.
Oro, E. et al., "PDF-TREX: An approach for recognizing and extracting tables from PDF documents," 2009 10th International Conference on Document Analysis and Recognition, pp. 906-910, IEEE, 2009.
Paladines, J. et al., "An Intelligent Tutoring System for Procedural Training with Natural Language Interaction," Conference Paper, DOI: 10.5220/0007712203070314, Jan. 2019, 9 pages.
Paliwal, Shubham Singh, D. Vishwanath, Rohit Rahul, Monika Sharma, and Lovekesh Vig. "Tablenet: Deep learning model forendto-end table detection and tabular data extraction from scanned document images." International Conference on Document Analysis and Recognition (ICDAR), pp. 128-133. IEEE, 2019. (Year: 2019).
Pellicer, J. P., "Neural networks for document image and text processing," PhD Thesis, Universitat Politecnica de Valencia, Sep. 2017, 327 pages.
Pinto, D. et al., "Table extraction using conditional random fields," Proceedings of the 26th Annual International ACM SIGIR Conference on Research and Development in Information Retrieval (SIGIR '03), ACM, New York, NY, USA, pp. 235-242. DOI= http://dx.doi.org/10.1145/860435.860479 (2003), 8 pages.
Qasim, S. R. et al., "Rethinking Table Parsing using Graph Neural Networks," arXiv:1905.1339lvl [cs.CV]; 2019 International Conference on Document Analysis and Recognition (ICDAR), Sydney, Australia, 2019, pp. 142-147.
Rashid, Sheikh Faisal, Abdullah Akmal, Muhammad Adnan, Ali Adnan Aslam, and Andreas Dengel. "Table recognition inu heterogeneous documents using machine learning." In 2017 14th IAPR International conference on document analysis and recognition (ICDAR), vol. 1, pp. 777-782. IEEE, 2017. (Year: 2017).
Schreiber, S. et al., "DeepDeSRT: Deep Learning for Detection and Structure Recognition of Tables in Document Images," 2017 14th IAPR International Conference on Document Analysis and Recognition (ICDAR) Nov. 9-15, 2017, Retrieved from the Internet: https://www.dfki.de/fileadmin/user_upload/import/9672_PID4966073.pdf, 6 pages.
Staar, P. W. J. et al., "Corpus conversion service: A machine learning platform to ingest documents at scale," Applied Data Science Track Paper, KDD 2018, Aug. 19-23, 2018, London, United Kingdom, pp. 774-782.
Sun N., et al., "Faster R-CNN Based Table Detection Combining Corner Locating," 2019 International Conference on Document Analysis and Recognition (ICDAR), 2019, pp. 1314-1319.
Vincent, P. et al., "Extracting and composing robust features with denoising autoencoders," in Proceedings of the 25th International Conference on Machine Learning, Helsinki, Finland, 2008, 8 pages.
Xiang, R., Research Statement, Aug. 2018, 6 pages.
Xiao, Y. et al., "Text region extraction in a document image based on the Delaunay tessellation," Pattern Recognition, vol. 36, No. 3, Mar. 2003, pp. 799-809.
Final Office Action for U.S. Appl. No. 16/546,938 dated Jun. 8, 2023, 12 pages.
Non-Final Office Action for U.S. Appl. No. 16/546,938 dated Sep. 12, 2022, 9 pages.
Notice of Allowance for U.S. Appl. No. 17/395,201, dated Mar. 8, 2023, 8 pages.
Wiraatmaja, C. et al., "The Application of Deep Convolutional Denoising Autoencoder for Optical Character Recognition Preprocessing," 2017 International Conference on Soft Computing, Intel-

(56) References Cited

OTHER PUBLICATIONS ligent System and Information Technology (ICSIIT), IEEE, Sep. 2017, pp. 72-77.

\* cited by examiner

201

203

XYZ ICT Corp
XYZ ICT Services LTD

202 — 9 Off Kitengela Rd. P.O. Box 873 Nairobi NBI
00517 Kenya
V. +250 20 524 2032 4) +254 20 524 2032 9
http://www.xyziet.co.ke info@xyziet.co.ke TIN: KEP051534006T Invoice# INV/2018/0005
Invoice Date: 10-10-2018
Due Date: 09-11-2018
Source Doc: SO004
Fiscal Position: Normal
Reference: CX034

| Item | Description | Quantity | Unit Price(USD) | Amount |
|---|---|---|---|---|
| 1 | Professional Services Including set-up | 1 | 8340 | 8340 → 291 |
| 2 | Accounting Services With tax | 2 | 2323 | 2323 |
| 3 | Tax Services | 3 | 2809 | 2809 → 292 |
| 4 | Advisory Services For client 1, 2, 3 and 4 Including the tax — 293 | 3 | 3498 | 3498 |
| 5 | HR Consulting | 1 | 6897 | 6897 |
| 6 | Audit Assistance | 1 | 980 | 980 |
| 7 | VDA Assistance | 8 | 89799 | 8979 |
| 8 | Professional Services Including set-up | 1 | 8340 | 8340 |
| 9 | Accounting Services With tax | 2 | 2323 | 2323 |
| 10 | Accounting Services With tax | 2 | 2323 | 2323 |
| 11 | HR Consulting | 1 | 6897 | 6897 |
| 12 | Audit Assistance | 1 | 980 | 980 → 294 |
| 13 | Advisory Services For client 1, 2, 3 and 4 Including the tax — 295 | 3 | 3498 | 3498 |

204

Payment term: 30 Net Days Shipping
Terrific: FREE CARRIER

| Field | Value |
|---|---|
| Invoice # | INV/2018/0005 |
| Invoice Date | 10-10-2018 |
| Due Date | 09-11-2018 |
| Source Doc. | S00004 |
| Fiscal Position | Normal |
| Reference | CX034 |

XYZ ICT Corp

XYZ ICT Sevices LTD

9 Off Kitengela Rd P.O Box 873 Nairobi NBI

00517 Kenya

V +254 20 524 2032 \xe2\x94\x8c\xd|\xb3| +254 20 524 2032 9 → 261 b"http://www.xyzict.co.ke info i@xyzict.co.ke TIN: KEP05153400 6T"

500

| Item | Description | Quantity | Unit Price(USD) | Amount |
|---|---|---|---|---|
| 1 | Professional Services | 1 | 8340 | 8340 |
| | Including set-up | | | |
| 2 | Accounting Services | 2 | 2323 | 2323 |
| | With tax | | | |
| 3 | Tax Services | 3 | 2809 | 2809 |
| 4 | Advisory Services | 3 | 3498 | 3498 |
| | For client 1, 2, 3 and | | | |
| | Including the tax | | | |

FIG. 2B (cont.)

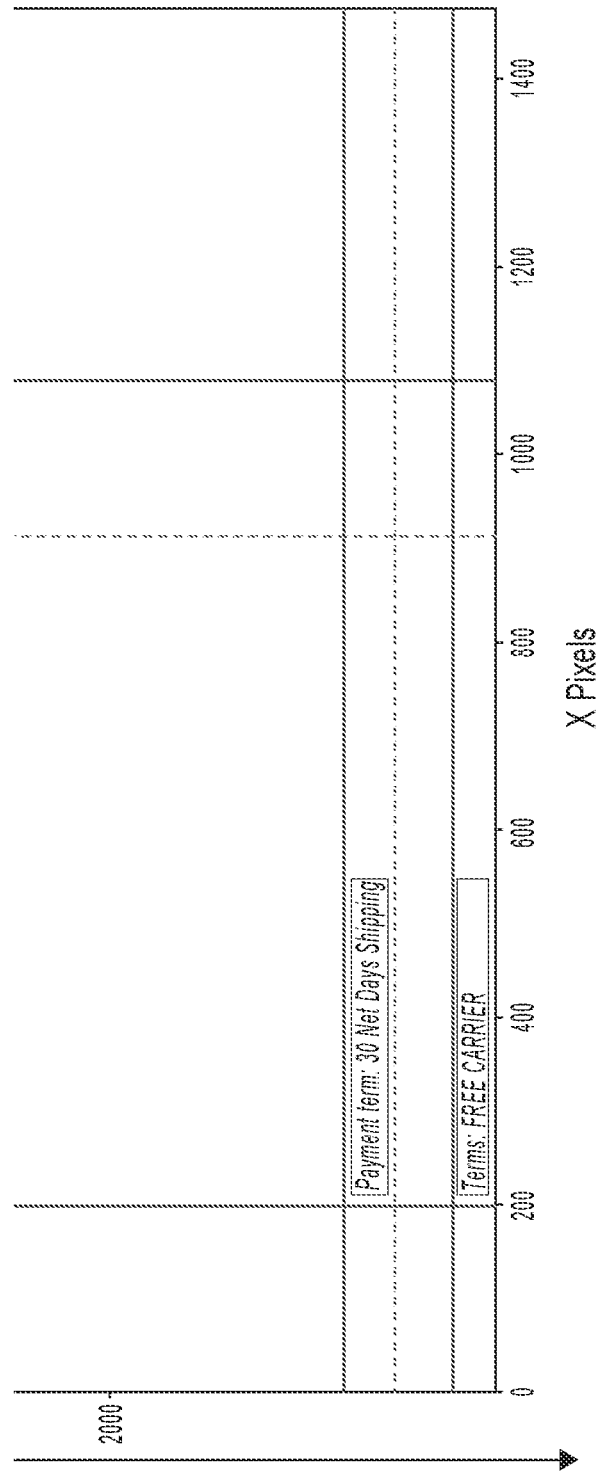

| | Index | Class | Entity_Sequence | Height | Center |
|---|---|---|---|---|---|
| | | 305 | 306 | 307 | 308 | 309 |
| 302 | 1 | I-MISC | None | 197 | 98.5 |
| | 2 | I-MISC | ORG_None_CARDINAL_None_PERSON_None_None_DATE_None_CARDINAL | 143 | 268.5 |
| | 3 | I-MISC | None_ORG_MONEY | 33 | 356.5 |
| | 4 | I-MISC | None_None_PERSON_None | 44 | 395 |
| 314 | 5 | I-MISC | None_None_None_None_None | 282 | 558 |
| 311 | 7 | I-HEADER | None_None_None_None_None_None_None | 49 | 774.5 |
| | 8 | I-ROW | CARDINAL_None_CARDINAL_CARDINAL_ORG_CARDINAL | 70 | 834 |
| 312 | 9 | P-ROW | None | 47 | 892.5 |
| | 10 | I-ROW | CARDINAL_None_CARDINAL_CARDINAL_ORG_CARDINAL | 73 | 952.5 |
| 313 | 11 | P-ROW | None | 33 | 1005.5 |
| | 12 | I-ROW | CARDINAL_None_CARDINAL_CARDINAL_None_CARDINAL | 87 | 1065.5 |
| | 13 | I-ROW | CARDINAL_None_CARDINAL_CARDINAL_ORG_CARDINAL | 80 | 1149 |
| | 14 | P-ROW | None | 40 | 1209 |
| | 15 | P-ROW | None | 33 | 1245.5 |
| | 16 | I-ROW | CARDINAL_None_CARDINAL_CARDINAL_None_CARDINAL | 94 | 1309 |
| 303 | 17 | I-ROW | CARDINAL_ORG_CARDINAL_CARDINAL_None_CARDINAL | 73 | 1392.5 |
| | 18 | I-ROW | CARDINAL_None_CARDINAL_CARDINAL_None_CARDINAL | 80 | 1469 |
| | 19 | I-ROW | CARDINAL_None_CARDINAL_CARDINAL_ORG_CARDINAL | 80 | 1549 |
| | 20 | P-ROW | None | 47 | 1612.5 |
| | 21 | I-ROW | CARDINAL_None_CARDINAL_CARDINAL_ORG_CARDINAL | 73 | 1672.5 |
| | 22 | P-ROW | None | 33 | 1725.5 |
| | 23 | I-ROW | CARDINAL_None_CARDINAL_CARDINAL_ORG_CARDINAL | 87 | 1785.5 |
| | 24 | P-ROW | None | 33 | 1845.5 |
| | 25 | I-ROW | CARDINAL_None_CARDINAL_CARDINAL_None_CARDINAL | 94 | 1909 |
| | 26 | P-ROW | CARDINAL_ORG_CARDINAL_CARDINAL_None_CARDINAL | 73 | 1992.5 |
| | 27 | I-ROW | CARDINAL_None_CARDINAL_CARDINAL_ORG_CARDINAL | 80 | 2069 |
| 304 | 28 | P-ROW | None | 40 | 2129 |
| | 29 | P-ROW | None | 33 | 2165.5 |
| | 30 | I-MISC | None | 85 | 2224.5 |

FIG. 3

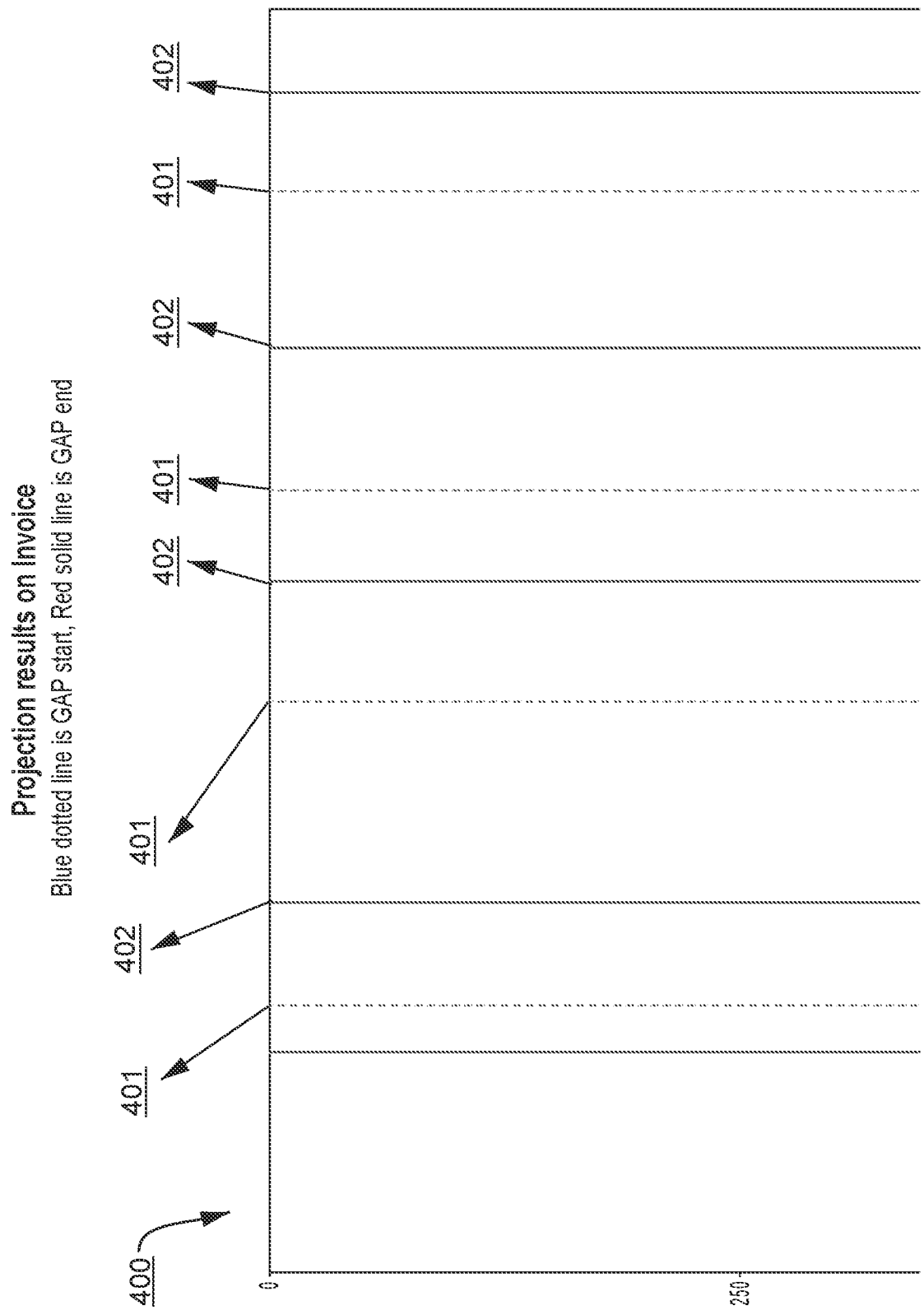

| | | | | | | |
|---|---|---|---|---|---|---|
| 6 | Audit Assistance | | 1 | | 980 | 980 |
| 7 | VDA Assistance | | 8 | | 89799 | 8979 |
| 8 | Professional Services<br>Including set-up | | 1 | | 8340 | 8340 |
| 9 | Accounting Services<br>With tax | | 2 | | 2323 | 2323 |
| 10 | Accounting Services<br>With tax | | 2 | | 2323 | 2323 |

1250

1500

500

| Item | Description | Quantity | Unit Price(USD) | Amount |
|---|---|---|---|---|
| 1 | Professional Services<br>Including set-up | 1 | 8340 | 8340 |
| 2 | Accounting Services<br>With tax | 2 | 2323 | 2323 |
| 3 | Tax Services | 3 | 2809 | 2809 |
| 4 | Advisory Services<br>For client1, 2, 3 and 4<br>Including the tax | 3 | 3498 | 3498 |
| 5 | HR Consulting | 1 | 6897 | 6897 |
| 6 | Audit Assistance | 1 | 980 | 980 |
| 7 | VDA Assistance | 8 | 89799 | 8979 |
| 8 | Professional Services<br>Including set-up | 1 | 8340 | 8340 |
| 9 | Accounting Services<br>With tax | 2 | 2323 | 2323 |
| 10 | Accounting Services<br>With tax | 2 | 2323 | 2323 |
| 11 | HR Consulting | 1 | 6897 | 6897 |
| 12 | Audit Assistance | 1 | 980 | 980 |
| 13 | Advisory Services | 3 | 3498 | 3498 |

XYZ ICT Corp
XYZ ICT Services LTD

9 Off Kitengela Rd. P.O. Box 873 Nairobi NBI
00517 Kenya
V. +250 20 524 2032 4) +254 20 524 2032 9
http://www.xyziet.co.ke info@xyziet.co.ke  TIN: KEP051534006T Invoice# INV/2018/0005
Invoice Date: 10-10-2018
Due Date: 09-11-2018
Source Doc: SO004
Fiscal Position: Normal
Reference: CX034

| Item | Description | Quantity | Unit Price(USD) | Amount |
|---|---|---|---|---|
| 1 | Professional Services Including set-up | 1 | 8340 | 8340 |
| 2 | Accounting Services With tax | 2 | 2323 | 2323 |
| 3 | Tax Services | 3 | 2809 | 2809 |
| 4 | Advisory Services For client 1, 2, 3 and 4 Including the tax | 3 | 3498 | 3498 |
| 5 | HR Consulting | 1 | 6897 | 6897 |
| 6 | Audit Assistance | 1 | 980 | 980 |
| 7 | VDA Assistance | 8 | 89799 | 8979 |
| 8 | Professional Services Including set-up | 1 | 8340 | 8340 |
| 9 | Accounting Services With tax | 2 | 2323 | 2323 |
| 10 | Accounting Services With tax | 2 | 2323 | 2323 |
| 11 | HR Consulting | 1 | 6897 | 6897 |
| 12 | Audit Assistance | 1 | 980 | 980 |
| 13 | Advisory Services For client 1, 2, 3 and 4 Including the tax | 3 | 3498 | 3498 |

Payment term: 30 Net Days Shipping
Terrific: FREE CARRIER

600

602

| Item | Description | Quantity | Unit Price(USD) | Amount |
|------|-------------|----------|-----------------|--------|
| 14 | Professional Services Including set-up | 1 | 8340 | 8340 |
| 15 | Accounting Services With tax | 2 | 2323 | 2323 |
| 16 | Tax Services | 3 | 2809 | 2809 |
| 17 | Advisory Services For client1, 2, 3 and 4 Including the tax | 3 | 3498 | 3498 |
| 8 | HR Consulting | 1 | 6897 | 6897 |
| 19 | Audit Assistance | 1 | 980 | 980 |

| | |
|---|---|
| Gross Total | 33477.00 |
| Sales Tax | 0.00 |
| Prepaid Amount | 0.00 |
| Invoice Total | 33457.00 |

BILLING CONTACT: DEBBIE Z 617-999-9999 debbie.z@zzz.com

*Due to our fiscal year end close, your payment is appreciated no later than OCT 30, 2018 Thank You!*

PLEASE PAY BY INVOICE NUMBER AND ENCLOSE
REMITTANCE ADVICE
Deu Upon Receipt

To ensure proper application of your electronic payment, please provide client and invoice number details directly to:

gss.accountsreceivable@zzzz.xx.com or fax to 1-866-493-9009

Payment term: 30 Net Days Shipping
Terrific: FREE CARRIER

Projection results on invoice
Blue dotted line is GAP start. Red solid line is GAP end

*(Figure showing projection results on an invoice with labeled fields including: b'XYZ ICT Corp', b'XYZ ICT Services LTD', b'9 Off Kitengela Rd. P.O Box 873 Nairobi NBI', b'00517 Kenya', b'IV: +254 20 324 2032 \\xc3\\x82\\xc2\\xa3 +254 20 324 2032 9', b'http://www.xyzict.co.ke info@xyzict.co.ke TIN: KEP051634006T', b'Invoice# INV/2018/0005', b'Invoice Date: 10-10-2018', b'Due Date: 09-11-2018', b'Source Doc', b'S0004', b'Fiscal Position: Normal', b'Reference:', b'CX034' — with the right-side column labeled "Non-Table" and reference 610)*

| b'Item' | b'Description' | b'Quantity' | b'Unit Price(USD)' | b'Amount' |
|---|---|---|---|---|
| b'1' | b'Professional Services' | | b'8340' | b'8340' |
| | b'Including set-up' | | | |
| b'2' | b'Accounting Services' | b'1' | | |
| | b'With tax' | b'2' | b'2323' | b'2323' |
| b'3' | b'Tax Services' | b'3' | b'2809' | b'2809' |
| b'4' | b'Advisory Services' | b'3' | b'3498' | b'3498' |
| | b'For client 1, 2, 3 and' | | | |
| | b'Including the tax' | | | |
| b'5' | b'HR Consulting' | b'1' | b'6897' | b'6897' |

| | | | | | | | | | | | |
|---|---|---|---|---|---|---|---|---|---|---|---|
| b'14' | b'Professional Services' | b'Including set-up' | b'1' | b'9940' | b'9940' | | | | | | |
| b'15' | b'Accounting Services' | b'With tax' | b'2' | b'2323' | b'2323' | | | | | | |
| b'16' | b'Tax Services' | | b'3' | b'2809' | b'2809' | | | | | | |
| b'17' | b'Advisory Services' | b'For client 1, 2, 3 and' b'Including the tax' | b'3' | b'3498' | b'3498' | | | | | | |
| b'18' | b'HR Consulting' | | b'1' | b'6897' | b'6897' | | | | | | |
| b'19' | b'Audit Assistance' | | b'1' | b'980' | b'980' | | | | | | |

Table-1

Page - 2 b'3477.00'
b'0.00'
b'0.00'
b'3457.00' b'Gross Total'
b'Sales Tax'
b'Prepaid Amount'
b'Invoice Total' b'BILLING CONTACT: DEBBIE Z 617-999-9999 debbie.z@zzz.com'
b'Due to our fiscal year end close, your payment is appreciated no later than'
b'Thank You!'

3600

| | I-MISC | I-MISC | | I-HEADER | I-ROW | P-ROW | I-ROW | P-ROW | I-ROW |
|---|---|---|---|---|---|---|---|---|---|
| | b'V: +254 20 524 2032 \xc3\xk82\xc2\xa3) +254 20 524 2032 9' | | b'Fiscal Position: Normal' | | | | | | |
| | | b'http://www.xyzict.co.ke info !@' xyzict.co.ke TIN: KEP051534006T" | b'Reference:' | b'CX034' | | | | | |
| | | | | b'Amount' | | | | | |
| | | | | b'Unit Price(USD)' | b'8340' | | b'2323' | | b'2809' |
| | | | | b'Quantity' | b'1' | | b'2' | | b'3' |
| | | | | b'Description' | b'8340' | | b'2323' | | b'2809' |
| b'Item' | | | | | | | | | |
| b'1' | | | | | b'Professional Services' | | | | |
| | | | | | | b'including set-up' | | | |
| b'2' | | | | | b'Accounting Services' | | | | |
| | | | | | | | | b'With tax' | |
| b'3' | | | | | b'Tax Services' | | | | |

*Table rotated 90°; columns left-to-right are labeled: I-ROW, P-ROW, P-ROW, I-ROW, I-ROW, I-ROW, I-ROW, P-ROW, I-ROW, P-ROW*

| I-ROW | P-ROW | P-ROW | I-ROW | I-ROW | I-ROW | I-ROW | P-ROW | I-ROW | P-ROW |
|---|---|---|---|---|---|---|---|---|---|
| b'4' | b'Advisory Services' | b'3' | b'3498' | b'3498' | | | | | |
| | b'For client 1, 2, 3 and' | | | | | | | | |
| | b'Including the tax' | | | | | | | | |
| b'5' | b'HR Consulting' | b'1' | b'6897' | b'6897' | | | | | |
| b'6' | b'Audit Assistance' | b'1' | b'980' | b'980' | | | | | |
| b'7' | b'VDA Assistance' | b'8' | b'89799' | b'8979' | | | | | |
| b'8' | b'Professional Services' | b'1' | b'8340' | b'8340' | | | | | |
| | b'Including set-up' | | | | | | | | |
| b'9' | b'Accounting Services' | b'2' | b'2323' | b'2323' | | | | | |
| | b'With tax' | | | | | | | | |

Page - 1

| I-HEADER | | | | | I-ROW | P-ROW | I-ROW | P-ROW |
|---|---|---|---|---|---|---|---|---|
| b'Item' | b'Description' | b'Quantity' | b'Unit Price(USD)' | b'Amount' | | | | |
| b'14' | b'Professional Services' | b'1' | b'8940' | b'8940' | | | | |
| | b'Including set-up' | | | | | | | |
| b'15' | b'Accounting Services' | b'2' | b'2323' | b'2323' | | | | |
| | b'With tax' | | | | | | | |

Page - 2   2500

MACHINE LEARNING BASED END-TO-END EXTRACTION OF TABLES FROM ELECTRONIC DOCUMENTS

CROSS-REFERENCE TO RELATED APPLICATION

This application is a continuation of U.S. patent application Ser. No. 16/781,195, titled "Machine Learning Based End-to-End Extraction of Tables From Electronic Documents," filed Feb. 4, 2020, now U.S. Pat. No. 11,625,934, the disclosure of which is hereby incorporated by reference in its entirety.

FIELD OF THE DISCLOSURE

This disclosure relates to electronic document review and conversion, and more specifically, to machine learning based models for identifying and extracting tables associated with an electronic document.

BACKGROUND

Scanned documents and other image-based documents are often degraded with artifacts such as blurring and fading. Using Optical Character Recognition (OCR) to convert such image-based documents into documents with computer-readable characters is challenging, especially when these documents include tables. Thus, a need exists to improve the accuracy when identifying and extracting tables from such image-based documents.

BRIEF DESCRIPTION OF THE FIGURES

FIGS. 2A-2B show examples of projection-based white space identification of an example electronic document, according to some embodiments.

FIG. 3 shows an example of a class table with associations between the set of rows in an example electronic document and its corresponding class from a set of classes, according to some embodiments.

FIG. 5 shows an example electronic document generated by the table identification and extraction system, according to some embodiments.

SUMMARY

Figure 1:
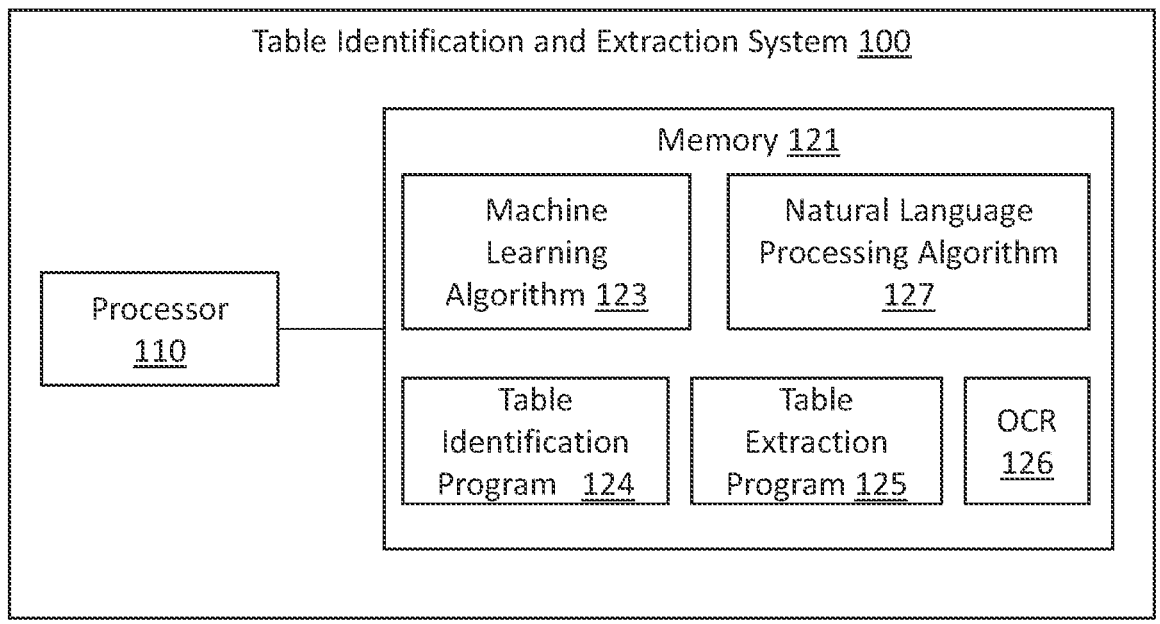
FIG. 1 shows a block diagram illustrating a table identification and extraction system, according to some embodiments.

In some embodiments, a method includes identifying a set of word bounding boxes in a first electronic document. Each word bounding box from the set of word bounding boxes is associated with a word from a set of words in the first electronic document. The first electronic document includes a table having a set of table cells positioned in a set of rows and a set of columns. The method further includes identifying, based on coordinates of the set of word bounding boxes, locations of horizontal white space between two adjacent rows from the set of rows. The method includes determining, using a Natural Language Processing algorithm, an entity name from a set of entity names for each table cell from the set of table cells. The method includes determining, using a machine learning algorithm and based on (1) the locations of horizontal white space and (2) the plurality of entity names, a class from a set of classes for each row from the set of rows in the table. The method includes extracting a set of table cell values associated with the set of table cells based on, for each row from the set of rows, the class from the set of classes for that row. The method includes generating a second electronic document including the set of table cell values arranged in the set of rows and the set of columns and based on (1) the locations of horizontal white space, (2) locations of vertical white space, such that the set of words in the table are computer-readable in the second electronic document.

DETAILED DESCRIPTION

Knowledge workers spend significant amounts of time reviewing electronic documents to locate information/data of interest. For example, when reviewing a contract (e.g., in a scanned electronic form or an image-based document form), a knowledge worker may manually search for one or more data elements of interest, such as "Start Date" or "Rent Amount," or for the presence or absence of contractual clauses of interest, such as "Termination Options." Known approaches for partially automating electronic document review processes typically involve considerable effort on the part of the knowledge worker, who provides annotations for large volumes of training data as part of model generation. Such known approaches generally involve the use of specialized tools, and the training of the associated models is often performed outside the regular workflow. As such, setting up and maintaining such systems can be prohibitively resource-intensive and time consuming. Moreover, the computer-based extraction of data (e.g., numeric, text, tables, etc.) from electronic documents can be inefficient due to errors that are commonly introduced into electronic documents as a result of optical character recognition (OCR) processing, automated language translation and/or automated spell checking of the electronic documents. In addition, for an electronic document including tables, extracting data contained within a table together with the layout of the data in the table can be challenging.

Table identification and extraction systems and methods of the present disclosure address the foregoing issues by identifying, extracting, and reproducing data and tables from scanned documents and other image-based documents (e.g., pictures, invoices, financial statements, purchase orders, and/or the like) with a higher speed, improved quality, increased accuracy and/or improved efficiency. Embodiments described here can identify, extract, and reproduce tables that span multiple pages in an electronic document, and multiple tables in an electronic document. Such embodiments allow relatively fast conversion of a large number of image-based documents containing a large number of tables (such as invoices, bank statements, purchase orders, and/or the like) into documents with computer-readable characters.

In some embodiments, a method includes identifying a set of word bounding boxes in a first electronic document. Each word bounding box from the set of word bounding boxes is associated with a word from a set of words in the first electronic document. The first electronic document includes a table having a set of table cells positioned in a set of rows and a set of columns. The method further includes identifying, based on coordinates of the set of word bounding boxes, locations of horizontal white space between two adjacent rows from the set of rows. The method includes determining, using a Natural Language Processing algorithm, an entity name from a set of entity names for each table cell from the set of table cells. The method includes determining, using a machine learning algorithm and based on (1) the locations of horizontal white space and (2) the plurality of entity names, a class from a set of classes for each row from the set of rows in the table. The method includes extracting a set of table cell values associated with the set of table cells based on, for each row from the set of rows, the class from the set of classes for that row. The method includes generating a second electronic document including the set of table cell values arranged in the set of rows and the set of columns and based on (1) the locations of horizontal white space, (2) locations of vertical white space, such that the set of words in the table are computer-readable in the second electronic document.

As used herein, the singular forms "a," "an" and "the" include plural referents unless the context clearly dictates otherwise. Thus, for example, the term "an electronic document" is intended to mean a single electronic document or multiple electronic documents.

FIG. 1 shows a block diagram illustrating a table identification and extraction system, according to some embodiments. In some embodiments, the table identification and extraction system 100 is configured to identify and extract tables in electronic documents using a machine learning algorithm to reproduce the tables in a table format having computer-recognizable characters. In some embodiments, the electronic document can be a scanned document or an image-based document such as pictures, invoices, financial statements, picture orders, and/or the like.) In some embodiments, the electronic document can include a table or a plurality of tables. The table identification and extraction system 100 can provide end-to-end capabilities from receiving a scanned document or an image-based document having tables to generate an electronic document with the tables having computer-recognizable characters.

The table identification and extraction system 100 can include a processor 110 and a memory 121 operatively coupled to the processor 110. The table identification and extraction system 100 can be a compute device (or multiple compute devices) having processing capabilities. In some instances, the table identification and extraction system 100 can be any combination of hardware-based module(s) (e.g., a field-programmable gate array (FPGA), an application specific integrated circuit (ASIC), a digital signal processor (DSP)) and/or software-based module(s) (computer code stored in memory 121 and/or executed at the processor 110). In some instances, the table identification and extraction system 100 can be a server such as, for example, a web server, an application server, a proxy server, a telnet server, a file transfer protocol (FTP) server, a mail server, a list server, a collaboration server and/or the like. In other instances, the table identification and extraction system 100 can be a personal computing device such as a desktop computer, a laptop computer, a personal digital assistant (PDA), a standard mobile telephone, a tablet personal computer (PC), and/or so forth. In some instances, the table identification and extraction system 100 can communicate with other servers or client devices (not shown) via a network (not shown) (e.g., the Internet, an intranet, a local area network (LAN), a virtual private network (VPN), a wireless LAN (WLAN), a wired network, a wireless network and/or the like).

The memory 121 can be, for example, a random-access memory (RAM) (e.g., a dynamic RAM, a static RAM), a flash memory, a removable memory, a hard drive, a database and/or so forth. In some implementations, the memory 121 can include (or store), for example, a database, process, application, virtual machine, and/or other software modules (stored and/or executing in hardware) and/or hardware modules configured to execute a table identification and extraction process as described with regards to FIG. 7 (discussed below). In such implementations, instructions for executing the table identification and extraction process and/or the associated methods can be stored within the memory 121 and executed at the processor 110. In some implementations, the memory 121 can store the machine learning (ML) algorithms 123, the Natural Language Processing (NLP) algorithm(s) 127, the table identification program 124, the table extraction program 125, and the Optical Character Recognition (OCR) 126.

The processor 110 can be configured to, for example, write data into and read data from the memory 121, and execute the instructions stored within the memory 121. The processor 110 can also be configured to execute and/or control, for example, the operations of other components of the table identification and extraction system 100 (such as a network interface card, other peripheral processing components (not shown)). In some implementations, based on the instructions stored within the memory 121, the processor 110 can be configured to execute the table identification and extraction process described with respect to FIG. 7.

In use, the table identification and extraction system 100 can receive a first electronic document (e.g., a scanned document, an image-based document such as a picture, an invoice, a financial statement, a purchase order, and/or the like). The first electronic document can include a table having a set of alphanumeric characters in a set of table cells positioned in a set of rows and a set of columns. In some implementations, the first electronic document can include other data (e.g., texts and/or pictures) that are not arranged in a table format. The table identification and extraction system 100 can use the OCR 126 (or an OCR program external to the table identification and extraction system 100) to convert the first electronic document to a second electronic document having computer-recognizable characters. The OCR 126 (or an OCR program external to the table identification and extraction system 100) can detect and localize coordinates of a set of character bounding boxes. Each character bounding box from the set of character bounding boxes can contain, for example, an alphanumeric character from the set of alphanumeric characters from the first electronic document. In some implementations, the coordinates of each character bounding box includes a horizontal position (an x-axis value) and/or a vertical position (a y-axis value) of each corner of the four corners of the character bounding box. In other implementations, the coordinates of each character bounding box can include (1) a horizontal position (an x-axis value) and/or a vertical position (a y-axis value) of the center of each character bounding box and (2) the size (height and/or width) of each character bounding box.

The table identification program 124 can identify, based on the coordinates of the set of character bounding boxes and using an algorithm, coordinates of a set of word bounding boxes. The algorithm can be stored in the memory 121. Each word bounding box from the set of word bounding boxes contains a word from a set of words in the first electronic document. In some implementations, the coordinates of each word bounding box includes a horizontal position (an x-axis value) and/or a vertical position (a y-axis value) of each corner of the four corners of the word bounding box. In other implementations, the coordinates of each word bounding box includes (1) a horizontal position (an x-axis value) and/or a vertical position (a y-axis value) of the center of each word bounding box and (2) the size (height and/or width) of each word bounding box. In some implementations, the algorithm can be a character grouping algorithm, for example, a Distance Metric algorithm (e.g., customization-based), and can be a supervised or unsupervised algorithm. The character grouping algorithm is based on spacing between characters, lower or upper cases of characters, small or large cases of characters, and average spacing on a page. The Distance Metric algorithm, for example, uses a distance function, which provides a relationship metric between the set of character bounding boxes from the second electronic document. In some implementations, for example, a capital case letter of the alphanumeric character can have a greater size of its character bounding box than that of a lower case letter of the alphanumeric character. Thus, the distance between a capital case letter and a lower case letter and the distance between two lower case letters are treated differently using the algorithm.

In some implementations, the table identification program 124 can identify, based on coordinates of the set of word bounding boxes, locations of horizontal white space between two adjacent rows from the set of rows. Specifically, based on the coordinates of the set of word bounding boxes (e.g., a horizontal position (an x-axis value) and/or a vertical position (a y-axis value) of each corner of the four corners of each word bounding box), the table identification program 124 can identify and project (or predict) the set of rows that have word(s)-filled pixels, as well as the horizontal white space (or horizontal gaps) between two adjacent rows that do not have the word(s)-filled pixels. Stated similarly, the portion of the horizontal position of the second electronic document that does not have projected pixels from the word bounding boxes can be considered as white space (or gaps). In some implementations, the table identification program 124 can record the coordinates of the start and the end of horizontal white space between two adjacent rows from the set of rows.

Figure 2B:
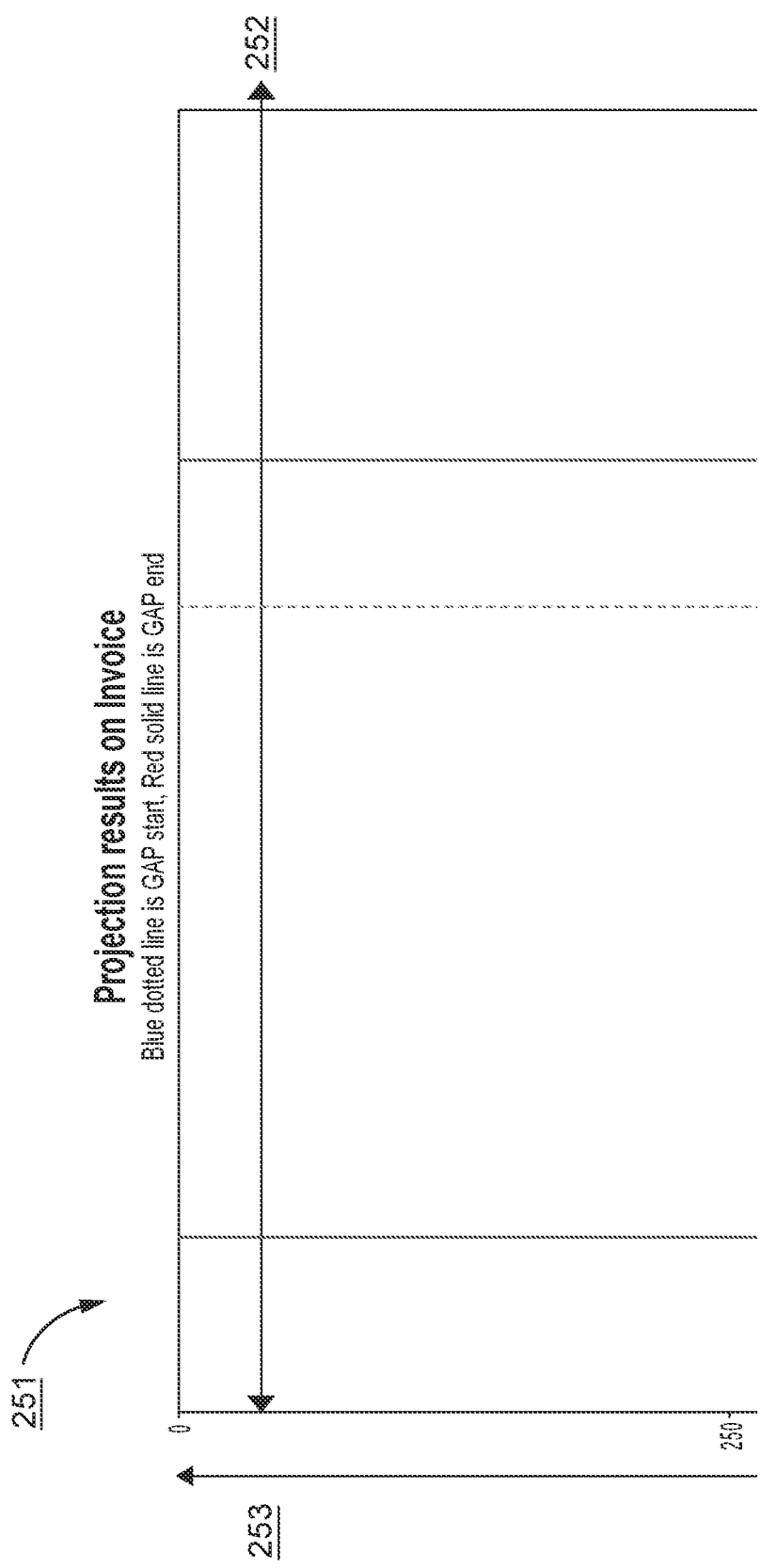
Figure 2B:
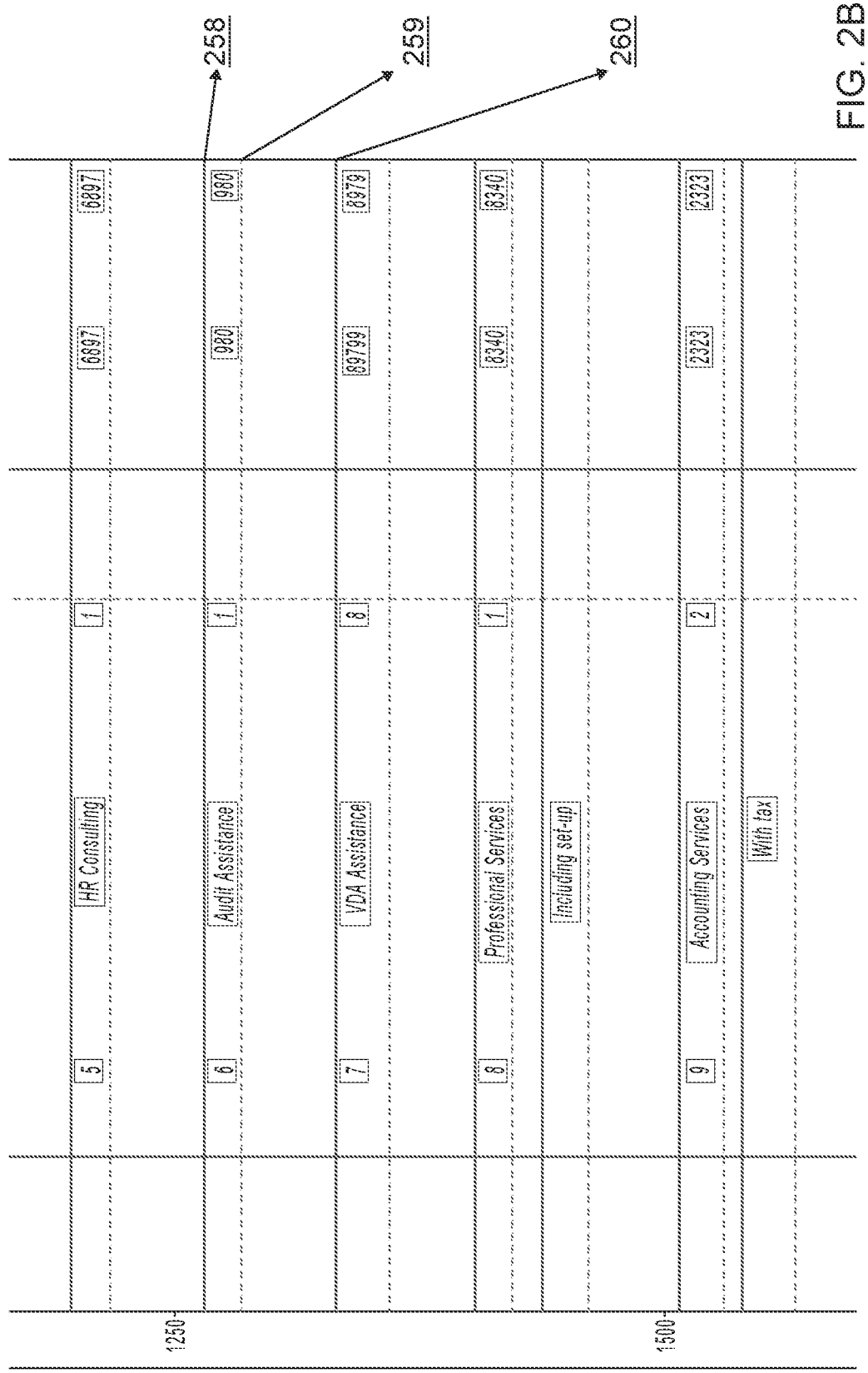
Figure 2B:
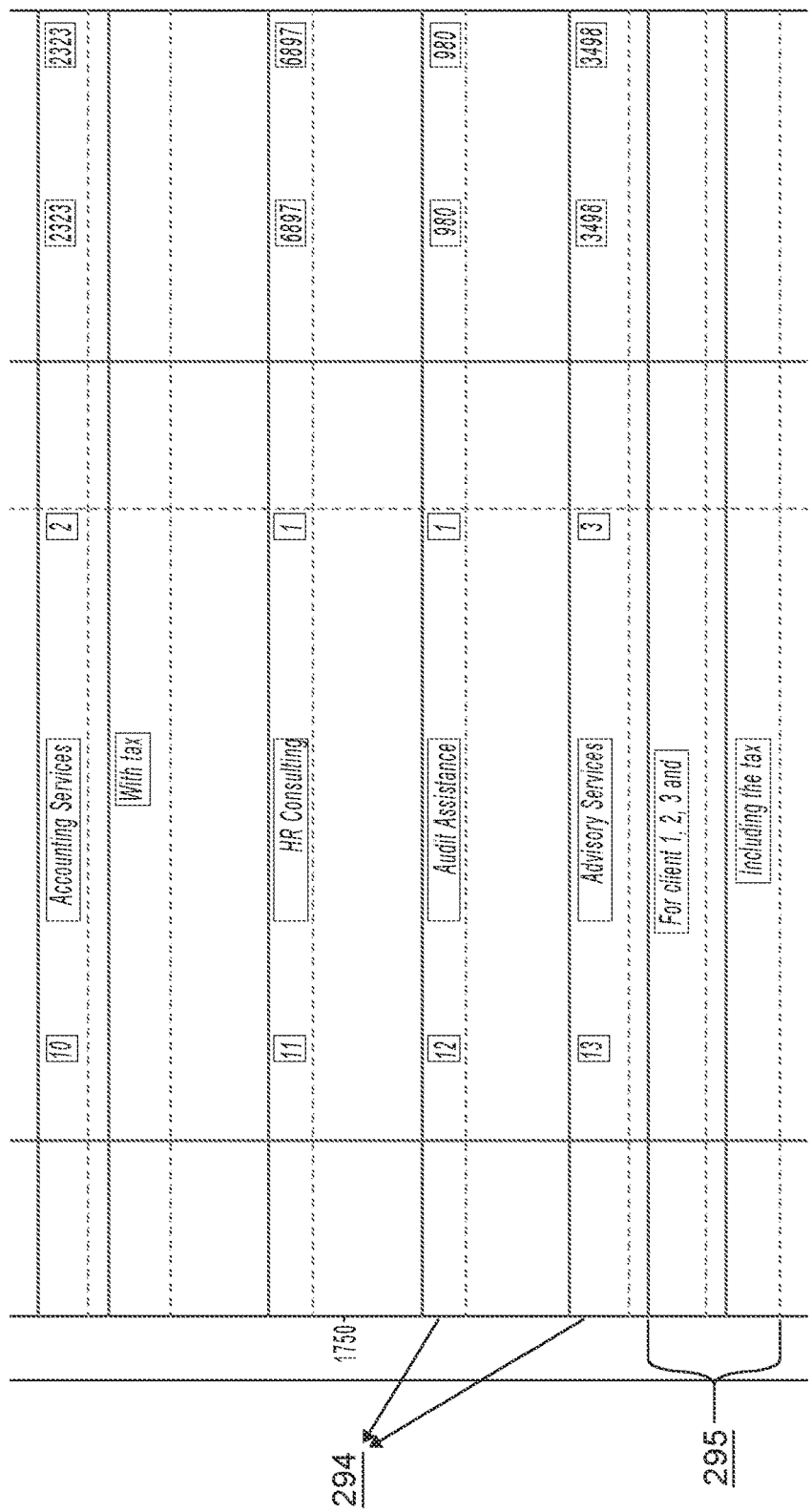

FIGS. 2A-2B show an example of projection-based white space identification of an example electronic document, according to some embodiments. The electronic document 201 can be an image-based document that includes an invoice. The electronic document 201 includes a first section 202, a second section 203, and a third section 204, in which each section can be a separate table having a set of rows and a set of columns. In some instances, the electronic document can be a single table having a set of rows and a set of columns. The OCR 126 of the table identification and extraction system 100 in FIG. 1 (or an OCR program external to the table identification and extraction system 100) can convert the electronic document 201 (i.e., the first electronic document) to a second electronic document (not shown) having computer-recognizable characters. The OCR 126 (or an OCR program external to the table identification and extraction system 100) can detect and localize coordinates of a set of character bounding boxes. The table identification program 124 of the table identification and extraction system 100 in FIG. 1 can identify, based on the coordinates of the set of character bounding boxes and using the character grouping algorithm, coordinates of a set of word bounding boxes 261 in the second electronic document 251. The table identification program 124 can define a horizontal dimension 252 (or an x-axis) and a vertical dimension 253 (or a y-axis) of the second electronic document 251. In some implementations, the coordinates of each word bounding box 261 includes a horizontal position (an x-axis value) and/or a vertical position (a y-axis value) of each corner of the four corners of the word bounding box 261. In other implementations, the coordinates of each word bounding box 261 includes (1) a horizontal position (an x-axis value) and/or a vertical position (a y-axis value) of the center of each word bounding box and (2) the size (height and/or width) of each word bounding box. The table identification program 124 can identify, based on coordinates of the set of word bounding boxes 261, locations of horizontal white space between two adjacent rows from the set of rows. For example, the solid lines, for example, 254, 256, 258, and 260 in FIG. 2B, indicate the start of a row (e.g., upper bound) of word bounding boxes. The dotted lines, for example, 255, 257, and 259 in FIG. 2B, indicate the end of a row (e.g., lower bound) of word bounding boxes. The table identification program 124 can identify the dotted lines (e.g., 255, 257, and 259) as the start of the horizontal white space (or horizontal gaps) and the following solid lines (e.g., 256, 258, and 260, respectively) as the end of that horizontal white space (or horizontal gaps).

Returning to FIG. 1, the table identification program 124 can determine, for each word bounding box from the set of word bounding boxes and using a natural language processing algorithm, an entity name from a set of entity names. The natural language processing algorithm can be stored in the memory 121. The natural language processing algorithm can be, for example, the named-entity recognition algorithm. The table identification program 124 can determine an entity name (or an entity category) for each word bounding box based on its meaning of the word contained in each word bounding box. The set of entity names include, but are not limited to, Cardinal, Date, Person, Organization, Physical Address, Money, Number, Picture, Web Address, Email, Photo Number, NoEntity, and/or the like. If a word bounding box has text that does not match any known entities, the row can be labeled as "NOENTITY". The table identification program 124 can determine, based on the entity name for each word bounding box, a sequence of entities for each row of the set of rows in the table. The table identification program 124 can identify the locations of each row of the set of rows based on the locations of horizontal white space. For example, for a row that includes three word bounding boxes, the table identification program 124 can determine, based on the natural language processing algorithm, an entity name for each word bounding boxes to be Cardinal, Date, and Person, respectively. Thus, the table identification program 124 can determine the sequence of entities for this row to be Cardinal_Date_Person.

In some implementations, the table identification program 124 can determine, using a machine learning algorithm and based on (1) the locations of horizontal white space and (2) the sequence of entities, a class (or a label, or a classifier) from a set of classes for each row from the set of rows in the table, and/or (3) the sequence of rows from top to bottom of each page of the entire document. The table identification program 124 can store, in memory 121, a class table of the associations between each row from the set of rows and its class. The machine learning algorithm can be stored in the memory 121. In some implementations, the machine learning algorithm can be a trained model using training data. For example, the machine learning algorithm can be a Conditional Random Field (CRF) Machine Learning algorithm based on a probabilistic graphical model. In some implementations, the machine learning algorithm includes a set of weight values indicating probabilities of transition from one class from the set of classes to another class from the set of classes. For example, the trained Conditional Random Field (CRF) Machine Learning model includes two types of parameters that can be learned—namely transition probabilities and emission probabilities. These learned parameters can be used to predict the class for each row of a new table in an electronic document. The class having the highest predicted or inferred (using the trained class) probability value (or weight value) can be the predicted class for that row.

The table identification program 124 can use the machine learning algorithm to predict a class for each row based on the natural language meaning of the entity name of each word bounding box, a number of each entity in the sequence of entities for each row, the previous row's predicted class, the occurrence of predetermined keywords in the text of the word bounding boxes. In some implementations, the table identification program 124 can predict the class for each row based on additional information including the position of each entity name in the sequence of entities, the relationship of each entity name in the sequence of entities, and the context of the set of sequences of entities. The set of classes include, but not limited to, "Header", "Row", "Partial Row", "Table End", "Miscellaneous", and/or the like. In some implementations, the "Header" class indicates the starting row (or the header row) of the table (e.g., row 291 in FIGS. 2A-2B). The "Row" class indicates a row that spans across multiple columns (e.g., rows 292 and 294 in FIGS. 2A-2B). The "Partial Row" class indicates a partial row that does not span multiple columns (e.g., rows 293 and 295 in FIGS. 2A-2B). In other words, column (or columns) belonging to a specific row overflowing onto the next line can be a partial-row. In some implementations, any "Partial-Row" is associated with a "Row" all the time. The "Miscellaneous" class indicate rows that are outside the table (e.g., sections 202 and 203 in FIG. 2A) and/or rows between multiple tables in the electronic document. In some implementations, the table identification program 124 can identify the table that starts with a row having a Header class, includes a set of rows having Row classes and/or Partial Row classes, and ends with a row having a Table End class.

FIG. 3 shows an example of a class table with associations between the set of rows in an example electronic document and its corresponding class from a set of classes, according to some embodiments. The class table 300 includes an index column 305 indicating an identifier of each row from the set of rows in an example electronic document (e.g., the example electronic document in FIG. 2A). The class table 300 includes a class column 306 indicating the set of classes that the table identification program 124 determines for each row from the set of rows in the table using the machine learning algorithm. The class table 300 includes an entity sequence column 307, indicating the sequence of entities that the table identification program 124 determines for each row from the set of rows in the table using the natural language processing algorithm. The class table 300 includes a height column 308 indicating the height of each row from the set of rows and a center column 309 indicating the coordinates of the center of each row from the set of rows. The class table 300 for the example electronic document (e.g., the example electronic document in FIG. 2A) can include a first section 302 corresponding to the rows (202 and 203 in FIG. 2A) shown before the table (204 in FIG. 2A), a second section 303 corresponding to the table (204 in FIG. 2A), and a third section 304 corresponding to the rows shown after the table (204 in FIG. 2A). The class "I-HEADER" (or "Header") 311 indicates the starting row (or the header row) of the table (e.g., row 291 in FIGS. 2A-2B). The class "I-PROW" 312 (or "Partial Row") indicates a partial row that does not across multiple columns (e.g., rows 293 and 295 in FIGS. 2A-2B). The class "I-ROW" 313 (or "Row") indicates a row that spans multiple columns (e.g., rows 292 and 294 in FIGS. 2A-2B). The class "I-MISC" 314 (or "Miscellaneous") indicates rows that are outside the table (e.g., sections 202 and 203 in FIG. 2A) and/or rows between multiple tables in the electronic document.

Returning to FIG. 1, the table extraction program 125 can identify, based on coordinates of the set of word bounding boxes and the set of classes for the set of rows, locations of vertical white space between two adjacent columns from the set of columns. Specifically, based on the coordinates of the set of word bounding boxes (e.g., a horizontal position (a x-axis value) and/or a vertical position (a y-axis value) of each corner of the four corners of each word bounding box), the table extraction program 125 can identify and project (or predict) the set of columns that have word(s)-filled pixels, as well as the vertical white space (or vertical gaps) between two adjacent columns that do not have the word(s)-filled pixels. Stated similarly, the portion of the vertical dimension of the second electronic document that does not have projected pixels from the word bounding boxes can be considered as white space (or gaps). In some implementations, the table identification program 124 can record the coordinates of the start and the end of vertical white space between two adjacent columns from the set of columns. In some implementations, the table identification program 124 can run the projection of vertical white space based on the coordinates of each row from the set of rows (e.g., the height 308 and the center 309 of each row from the class table 300 in FIG. 3). In some implementations, the table identification program 124 can run the projection of vertical white space for a subset of rows that have the classes of "Header" "Row", and/or "Table End", and not for the remaining rows with the classes of "Partial Row" or "Miscellaneous." In such implementations, the remaining rows from the set of rows are different from the subset of rows from the set of rows.

Figure 4:
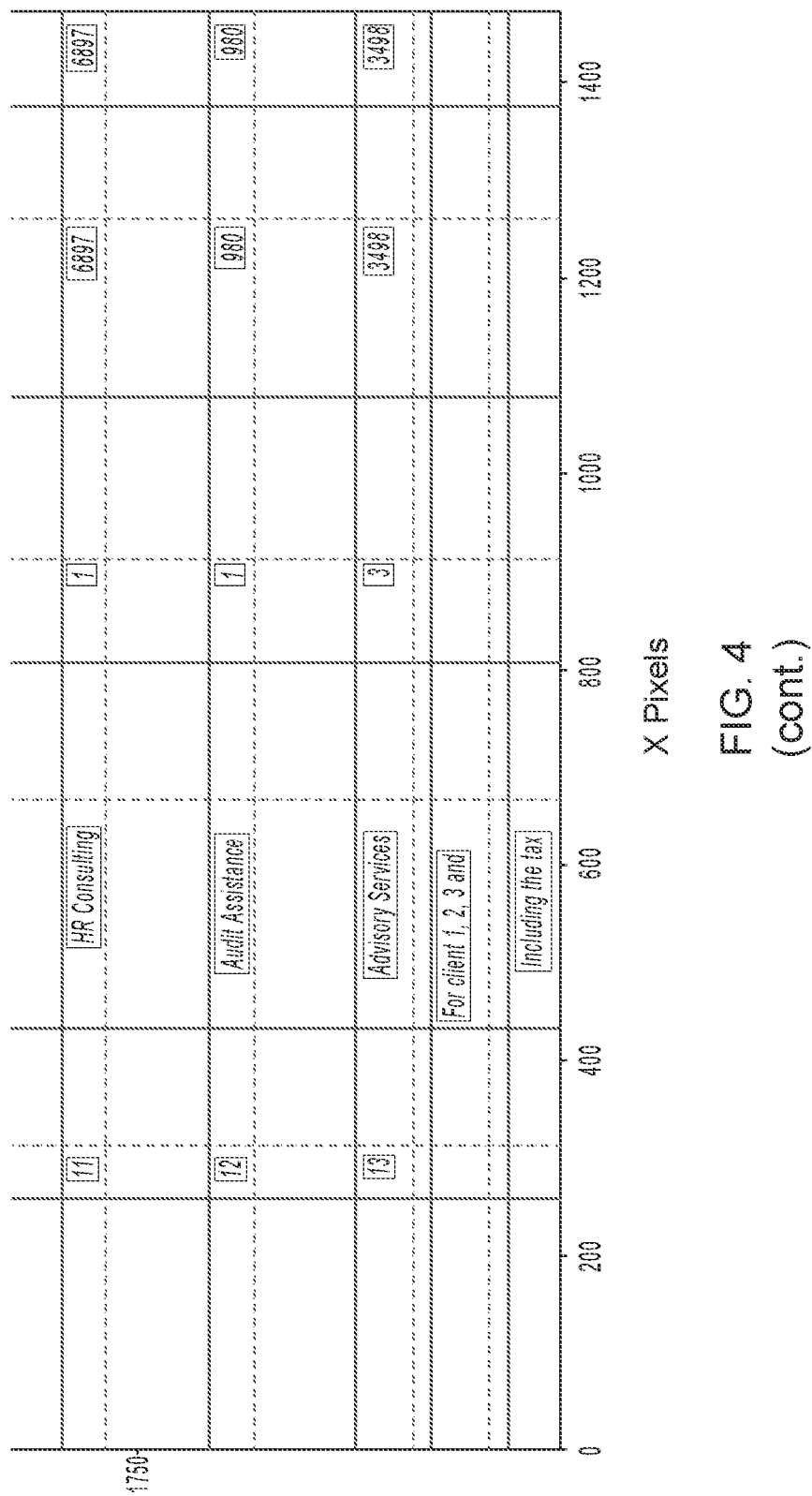
FIG. 4 shows an example of projection-based white space identification of an example electronic document, according to some embodiments.

FIG. 4 shows an example of projection-based white space identification of an example electronic document, according to some embodiments. The solid lines 402 indicate the start of a column of word bounding boxes. The dotted lines 401 indicate the end of a column of word bounding boxes. The table extraction program 125 can identify the dotted lines 401 as the start of the vertical white space (or vertical gaps) and the following solid lines 402 as the end of that vertical white space (or vertical gaps).

Returning to FIG. 1, as described herein, the table identification program 124 can identify the horizontal white space between two adjacent rows in a table and determine a class for each row of the set of the rows in the table. The table extraction program 125 can identify the vertical white space between two adjacent columns in the table. The table identification and extraction system 100 can determine the positions of the rows and the columns of the table based on the horizontal white space and the vertical white space. In some implementations, the table extraction program 125 can extract a set of table cell values (i.e., the alphanumeric characters or words in the set of word bounding boxes) associated with the set of table cells based on the class from the set of classes for each row from the set of rows in the table. In some implementations, the table extraction program 125 can extract first the table cell values for the row that have the classes of "Header" "Row", and/or "Table End", and not for the rows with the class of "Partial Row" or "Miscellaneous." The table extraction program 125 can then merge the table cell values for the rows with the class of "Partial Row" with the table cell values for the subset of rows. The table extraction program 125 can then generate a third electronic document including the set of table cell values arranged in the set of rows and the set of columns and based on (1) the locations of horizontal white space, (2) locations of vertical white space. The table extraction program 125 can generate the third electronic document in a format of Comma-Separated Values (CSV), Excel, or JavaScript Object Notation (JSON), and store the third electronic document in the memory 121.

FIG. 5 shows an example electronic document generated by the table identification and extraction system, according to some embodiments. Based on the horizontal white space, the vertical white space, and the set of table cell value for each table cell of the table, the table extraction program 125 can generate the third electronic document 500, that converts the texts and tables from the first electronic document (e.g., the electronic document 201 in FIG. 2A) into texts and tables that can be recognized, read, edited, and analyzed using a computer. The third electronic document 500 includes the computer-readable words arranged in a set of rows and a set of columns in a table format that allows convenient viewing, editing, and analyzing by compute devices. In addition, the table identification and extraction system 100 allows relatively fast conversion of a large number of image-based documents containing a large number of tables (such as invoices, bank statements, purchase orders, and/or the like) into documents with computer-readable characters.

Figure 6:
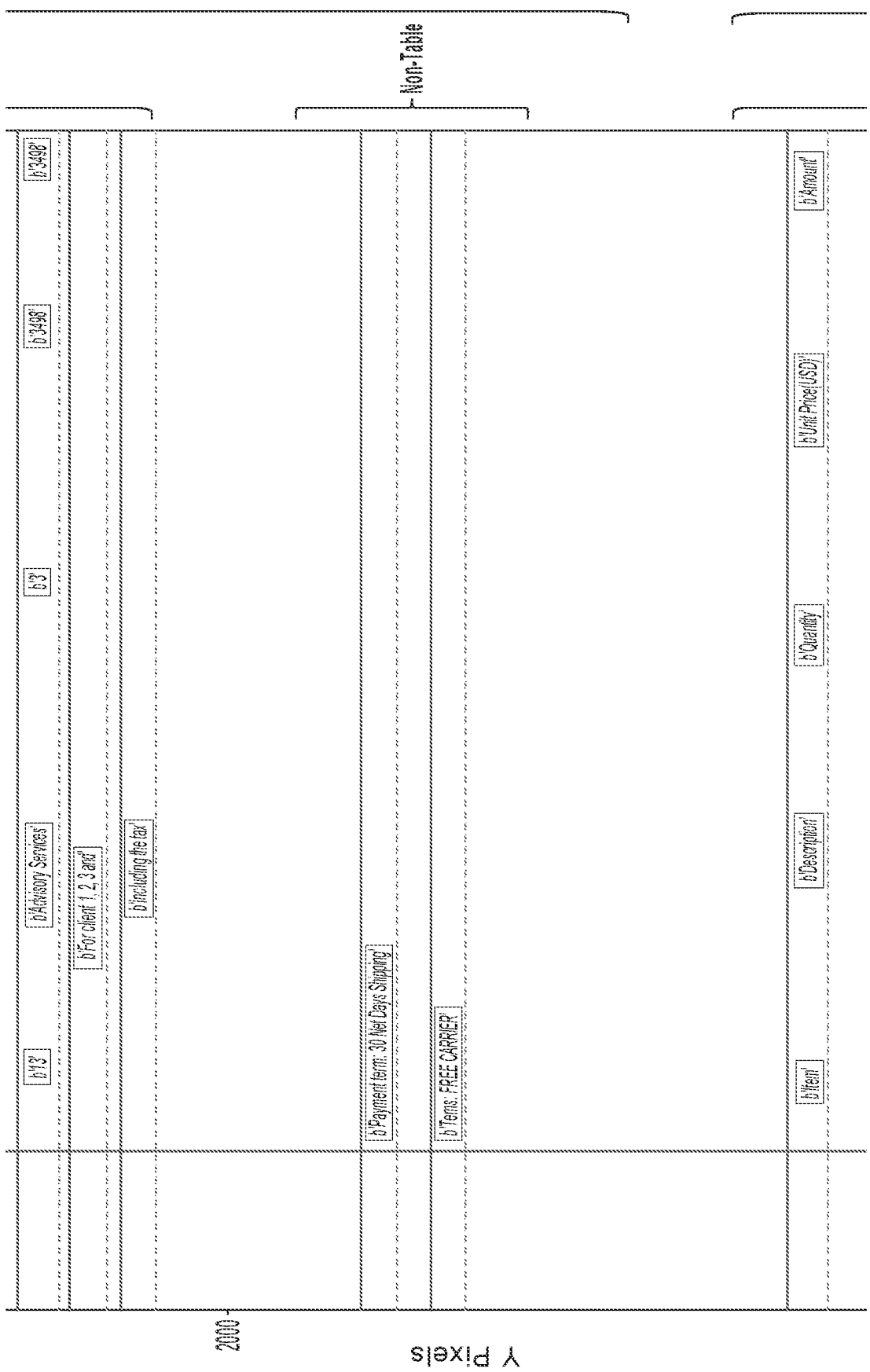
FIG. 6 shows an example electronic document having a table spanning across multiple pages, according to some embodiments.
Figure 6:
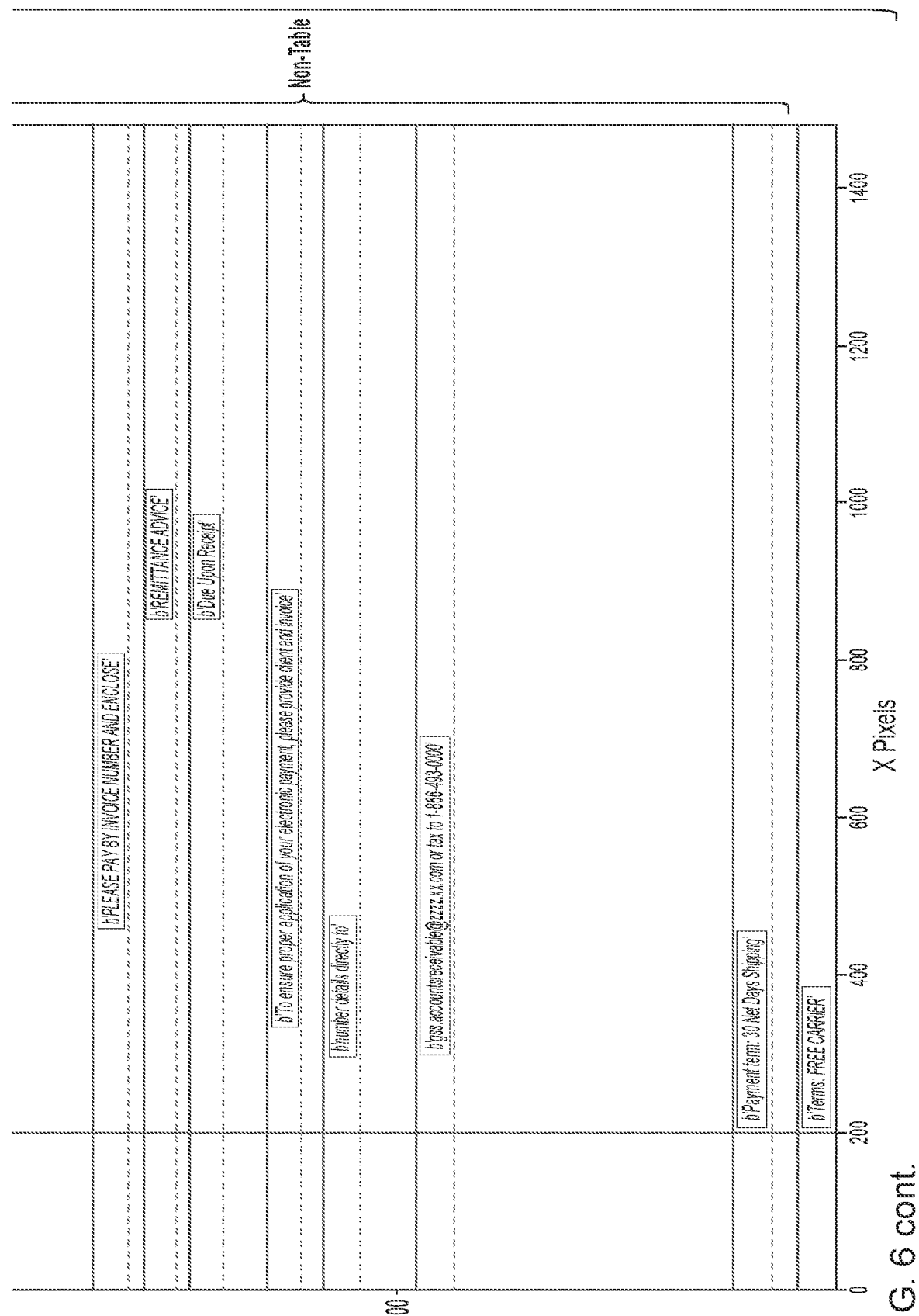
Figure 6:
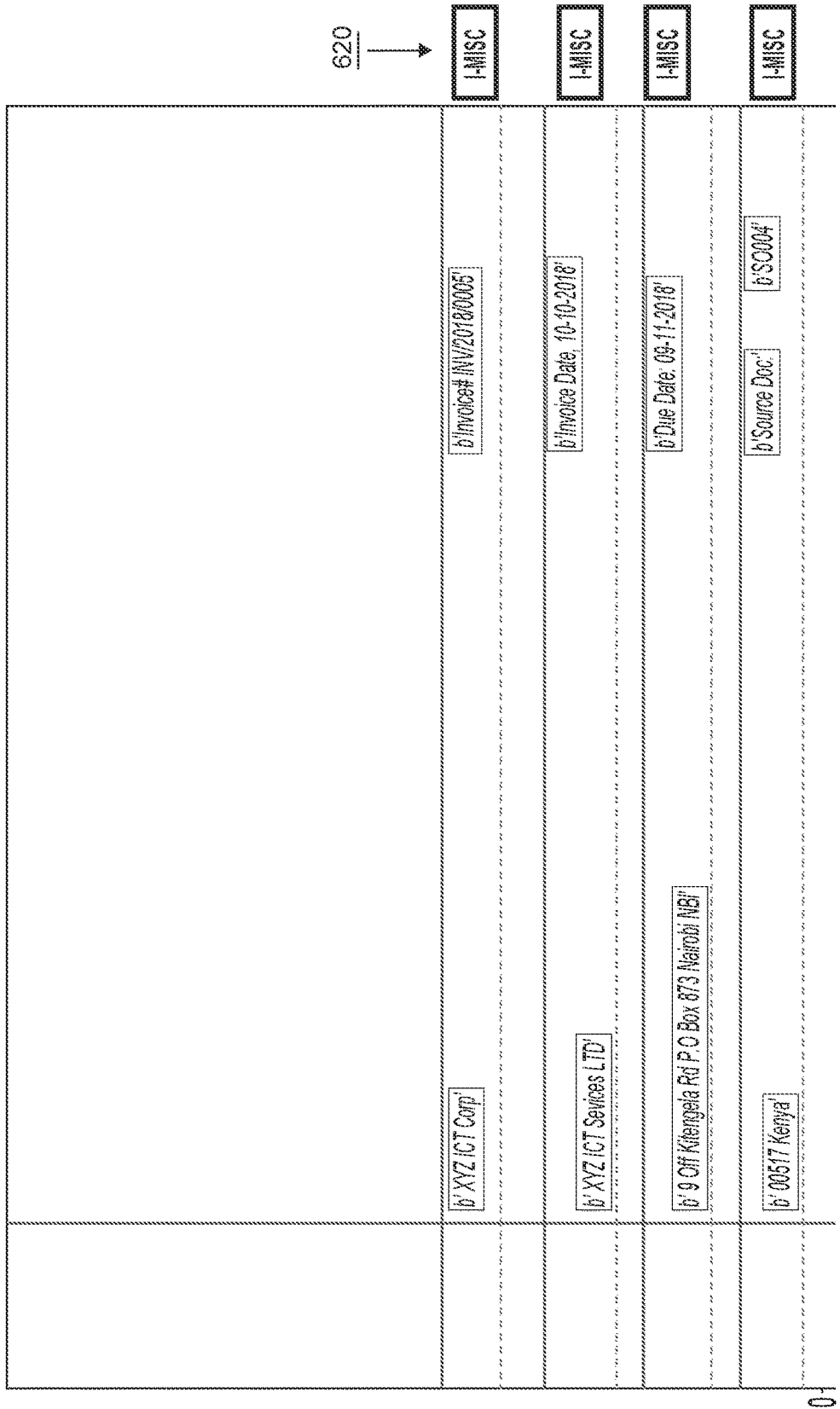

FIG. 6 shows an example electronic document having a table spanning across multiple pages, according to some embodiments. The electronic document can include a table 600 that spans multiples pages (e.g., first page 601 and second page 602) of the electronic document. The table identification and extraction system 100 can generate a second electronic document 610 by appending a vertical coordinate of the second page 602 with a vertical coordinate of the first page 601. The second electronic document 610 has one page including the set of words from the first page 601 and the second page 602. The table identification and extraction system 100 can treat the second electronic document 610 as an electronic document having one table, and identify and extract the table in the second electronic document 610 using the table identification and extraction process described herein in FIG. 7. For example, the table identification and extraction system 100 can identify a set of word bounding boxes in the second electronic document 610 and identify, based on coordinates of the set of word bounding boxes, locations of horizontal white space between two adjacent rows from the set of rows. The table identification and extraction system 100 can determine, using a Natural Language Processing algorithm, an entity name from a set of entity names for each table cell from the set of table cells in the table. The table identification and extraction system 100 can determine, using a machine learning algorithm and based on (1) the locations of horizontal white space and (2) the set of entity names, a class from a set of classes 620 for each row from the set of rows in the second electronic document 610, and/or (3) the sequence of rows from top to bottom of each page of the entire document. The table identification and extraction system 100 can identify, based on coordinates of the set of word bounding boxes and the set of classes for the set of rows, locations of vertical white space between two adjacent columns from the set of columns. The table identification and extraction system 100 can extract a set of table cell values associated with the set of table cells based on, for each row from the set of rows, the class from the set of classes for that row. The table identification and extraction system 100 can generate a third electronic document including the set of table cell values arranged in the set of rows and the set of columns and based on (1) the locations of horizontal white space, (2) locations of vertical white space, such that the set of words in the table of the second electronic document 610 are computer-readable in the third electronic document.

Figure 7:
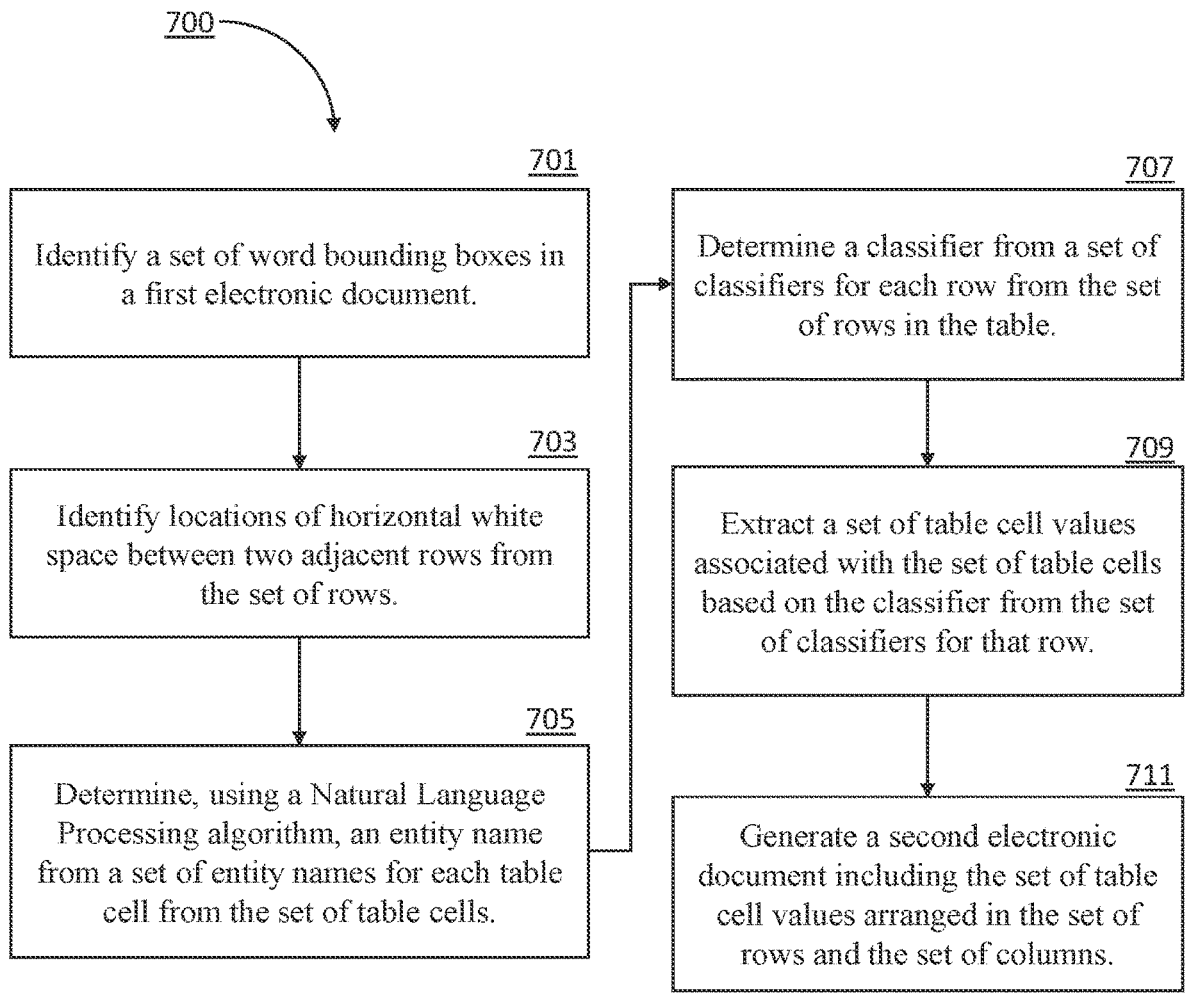
FIG. 7 shows a flow chart illustrating a table identification and extraction process using a machine learning algorithm, according to some embodiments.

FIG. 7 shows a flow chart illustrating a table identification and extraction process using a machine learning algorithm, according to some embodiments. This table identification and extraction process 700 can be implemented at a processor and/or a memory (e.g., processor 110 or memory 121 as discussed with respect to FIG. 1 of a table identification and extraction system 100).

At 701, the table identification and extraction process 700 includes identifying a set of word bounding boxes in a first electronic document. The first electronic document can include a scanned document, an image-based document such as a picture, an invoice, a financial statement, a purchase order, and/or the like. The first electronic document can include a table having a set of alphanumeric characters in a set of table cells positioned in a set of rows and a set of columns. The table identification and extraction system can use an Optical Character Recognition (OCR) to recognize the alphanumeric characters and localize coordinates of a set of character bounding boxes. Each character bounding box from the set of character bounding boxes contains an alphanumeric character from the set of alphanumeric characters from the first electronic document. Based on the coordinates of the set of character bounding boxes and using an algorithm, the table identification and extraction process 700 includes identifying a set of word bounding boxes in a first electronic document. Each word bounding box from the set of word bounding boxes contains a word from a set of words in the first electronic document. In some implementations, the coordinates of each word bounding box includes a horizontal position (an x-axis value) and/or a vertical position (a y-axis value) of each corner of the four corners of the word bounding box. In other implementations, the coordinates of each word bounding box includes (1) a horizontal position (an x-axis value) and/or a vertical position (a y-axis value) of the center of each word bounding box and (2) the size (height and/or width) of each word bounding box. In some implementations, this algorithm can be a character grouping algorithm, for example, a Distance Metric algorithm, and can be a supervised or unsupervised algorithm. The character grouping algorithm is based on spacing between characters, lower or upper cases of characters, small or large cases of characters, and average spacing on a page. The Distance Metric algorithm, for example, uses a distance function that provides a relationship metric between the set of character bounding boxes from the second electronic document.

At 703, the table identification and extraction process 700 includes identifying (projecting, or predicting), based on coordinates of the set of word bounding boxes, locations of horizontal white space between two adjacent rows from the set of rows. Specifically, based on the coordinates of the set of word bounding boxes (e.g., a horizontal position (a x-axis value) and/or a vertical position (a y-axis value) of each corner of the four corners of each word bounding box), the table identification and extraction process 700 includes identifying, projecting, or predicting locations of horizontal white space between two adjacent rows from the set of rows. In other words, the portion of the horizontal dimension of the first electronic document that does not have projected pixels from the word bounding boxes can be considered as white space (or gaps).

At 705, the table identification and extraction process 700 includes determining, using a Natural Language Processing algorithm, an entity name from a set of entity names for each table cell in each row from the set of table cells. The natural language processing algorithm can be, for example, the named-entity recognition algorithm. The table identification and extraction system determines an entity name for each word bounding box based on its meaning of the word contained in each word bounding box. The set of entity names include, but are not limited to, Cardinal, Date, Person, Organization, Physical Address, Money, Number, Picture, Web Address, Email, Photo Number, NoEntity, and/or the like. If a word bounding box has text that does not match any known entities, the row can be labeled as "NOENTITY". The table identification and extraction system determines, based on the entity name for each word bounding box, a sequence of entities for each row of the set of rows in the table. For example, for a row that includes three word bounding boxes, the table identification and extraction system determines, based on the natural language processing algorithm, an entity name for each word bounding box to be Cardinal, Date, and Person, respectively. Thus, the table identification and extraction system determines the sequence of entities for this row to be Cardinal_Date_Person.

At 707, the table identification and extraction process 700 includes determining, using a machine learning algorithm and based on (1) the locations of horizontal white space and (2) the plurality of entity names, a class from a set of classes for each row from the set of rows in the table, and/or (3) the sequence of rows from top to bottom of each page of the entire document. In some implementations, the machine learning algorithm can be a trained model using training data. For example, the machine learning algorithm can be a Conditional Random Field (CRF) Machine Learning algorithm based on a probabilistic graphical model. The table identification and extraction system uses the machine learning algorithm to predict a class for each row based on the natural language meaning of the entity of each word bounding box, a number of each entity in the sequence of entities for each row, the previous row's predicted class, the occurrence of predetermined keywords in the text of the word bounding boxes. In some implementations, the table identification program 124 can predict the class for each row based on additional information including the position of each entity in the sequence of entities, the relationship of each entity in the sequence of entities, and the context of the set of sequences of entities. The set of classes include, but not limited to, "Header", "Row", "Partial Row", "Table End", "Miscellaneous", and/or the like. In some implementations, the "Header" class indicates the starting row (or the header row) of the table. The "Row" class indicates a row that spans multiple columns. The "Partial Row" class indicates a partial row that does not span multiple. The "Miscellaneous" class indicates rows that are outside the table and/or rows between multiple tables in the electronic document. In some implementations, the table identification and extraction system identifies the table that starts with a row having a Header class, includes a set of rows having Row classes and/or Partial Row classes, and ends with a row having a Table End class.

In some implementations, the table identification and extraction process 700 includes identifying, based on coordinates of the set of word bounding boxes and the set of classes for the set of rows, locations of vertical white space between two adjacent columns from the set of columns. Specifically, based on the coordinates of the set of word bounding boxes (e.g., a horizontal position (a x-axis value) and/or a vertical position (a y-axis value) of each corner of the four corners of each word bounding box), the table identification and extraction system identifies and projects (or predicts) the set of columns that have word(s)-filled pixels, as well as the vertical white space (or vertical gaps) between two adjacent columns that do not have the word (s)-filled pixels. In some implementations, the table identification and extraction system runs the projection of vertical white space based on the coordinates of each row from the set of rows (e.g., the height 308 and the center 309 of each row from the class table 300 in FIG. 3). In some implementations, the table identification program 124 can run the projection of vertical white space for a subset of rows that have the classes of "Header" "Row", and/or "Table End", and not for the remaining rows with the classes of "Partial Row" or "Miscellaneous."

At 709, the table identification and extraction process 700 includes extracting a set of table cell values associated with the set of table cells based on, for each row from the set of rows, the class from the set of classes for that row. In some implementations, the table identification and extraction process 700 includes first extracting the table cell values for the subset of rows that have the classes of "Header" "Row", and/or "Table End", and not for the remaining rows with the class of "Partial Row" or "Miscellaneous." The table identification and extraction then merges the table cell values for the remaining rows with the class of "Partial Row" with the table cell values for the subset of rows.

At 711, the table identification and extraction process 700 includes generating a second electronic document including the set of table cell values arranged in the set of rows and the set of columns and based on (1) the locations of horizontal white space, (2) locations of vertical white space, such that the set of words in the table are computer-readable in the second electronic document. The second electronic document can be in a format of Comma-Separated Values (CSV), Excel, or JavaScript Object Notation (JSON). The second electronic document includes the computer-readable words arranged in a set of rows and a set of columns in a table format that allows convenient viewing, editing, and analyzing by compute devices. In addition, the second electronic document allows relatively fast conversion of a large number of image-based documents containing a large number of tables (such as invoices, bank statements, purchase orders, and/or the like) into documents with computer-readable characters.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor- readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer- readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Python, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A processor-readable non-transitory medium storing code representing instructions to be executed by a processor, the code comprising code to cause the processor to:
   identify a plurality of word bounding boxes in a first electronic document, each word bounding box from the plurality of word bounding boxes associated with a word from a plurality of words in the first electronic document, the first electronic document including a table having a set of table cells positioned in a set of rows and a set of columns;
   identify, based on a horizontal position and a vertical position of at least two corners of each word bounding box from the plurality of word bounding boxes, locations of horizontal gaps between two adjacent rows from the set of rows;
   determine, using a machine learning algorithm and based on (1) the locations of horizontal gaps and (2) a plurality of entity names from the table, a class from a set of classes for each row from the set of rows in the table;
   extract a set of table cell values associated with the set of table cells based on, for each row from the set of rows, the class from the set of classes for that row; and
   generate a second electronic document including the set of table cell values arranged in the set of rows and the set of columns and based on (1) the locations of horizontal gaps, (2) locations of vertical gaps, such that the plurality of words in the table are computer-readable in the second electronic document.

2. The processor-readable non-transitory medium of claim 1, the code further comprising code to cause the processor to:
   receive the first electronic document from an optical character recognition program.

3. The processor-readable non-transitory medium of claim 1, wherein:
   the first electronic document includes a first page and a second page;
   the code further comprising code to cause the processor to generate a third electronic document by appending a vertical coordinate of the second page with a vertical coordinate of the first page, the third electronic document having one page including the plurality of words from the first page and the second page.

4. The processor-readable non-transitory medium of claim 1, wherein the first electronic document includes a plurality of tables including the table.

5. The processor-readable non-transitory medium of claim 1, wherein the set of classes includes at least one of Header, Row, Partial Row, or Table End.

6. The processor-readable non-transitory medium of claim 1, wherein the second electronic document is in a format of Comma-Separated Values (CSV), Excel, or JavaScript Object Notation (JSON).

7. The processor-readable non-transitory medium of claim 1, wherein:
   the horizontal gaps includes horizontal gaps between each two adjacent rows from the set of rows.

8. An apparatus, comprising:
   a memory; and
   a processor operatively coupled to the memory, the processor configured to:
   identify each word bounding box from a plurality of word bounding boxes associated with a word from a plurality of words in a first electronic document,
   determine, based on locations of the plurality of word bounding boxes, gaps in a horizontal dimension of the first electronic document to identify a plurality of rows of a table included in the first electronic document, each row from the plurality of rows (1) including a set of words from the plurality of words and (2) being divided into a plurality of cells separated by the gaps in the horizontal dimension,
   determine, using a machine learning algorithm, a class from a set of classes for each row from the plurality of rows in the table based on (1) a sequence of entity names from a plurality of entity names and for each row from the plurality of rows, and (2) a class of a row proceeding that row,
   extract, for each row from a subset of rows from the plurality of rows and based on the class from the set of classes for that row, a first set of word values associated with a set of words included in that row,
   generate a second electronic document based on (1) the first set of word values in each row from the subset of rows, (2) the plurality of rows of the table, and (3) the gaps in the horizontal dimension, such that the plurality of words in the table are computer-readable in the second electronic document, the remaining rows from the plurality of rows being different from the subset of rows from the plurality of rows.

9. The apparatus of claim 8, wherein the processor is configured to receive the first electronic document from an optical character recognition program.

10. The apparatus of claim 8, wherein:
the first electronic document includes a first page and a second page;
the processor is configured to generate a third electronic document by appending a vertical coordinate of the second page with a vertical coordinate of the first page, the third electronic document having one page including the plurality of characters from the first page and the second page.

11. The apparatus of claim 8, wherein the first electronic document includes a plurality of tables including the table.

12. The apparatus of claim 8, wherein the second electronic document is in a format of Comma-Separated Values (CSV), Excel, or JavaScript Object Notation (JSON).

13. The apparatus of claim 8, wherein:
the set of classes includes at least one of Header, Row, Partial Row, or Table End;
each row from the subset of rows has a class of Row;
each row from the remaining rows has a class of Partial Row.

14. The apparatus of claim 8, wherein:
the processor is configured to determine, using a Natural Language Processing algorithm, an entity name from the plurality of entity names for each cell from the plurality of cells in each row from the plurality of rows, and the plurality of entity names includes at least one of Date, Person, Location, Organization, Number, Money, Cardinal, or No Entity.

15. The apparatus of claim 8, wherein the machine learning algorithm includes a set of weight values indicating probabilities of transition from one class from the set of classes to another class from the set of classes.

16. The apparatus of claim 8, wherein the table spans across multiple pages in the first electronic document.

17. The apparatus of claim 8, wherein the processor is configured to determine, based on (1) the locations of the plurality of word bounding boxes and (2) the set of classes for the plurality of rows, the gaps in a vertical dimension of the first electronic document.

18. A method, comprising:
identifying, based on locations of a plurality of character bounding boxes in a first electronic document, each word bounding box from a plurality of word bounding boxes associated with a word from a plurality of words in the first electronic document, the first electronic document including a table having a set of table cells positioned in a set of rows;
identifying, based on coordinates of the plurality of word bounding boxes, locations of horizontal gaps between two adjacent rows from the set of rows;
determining, using a machine learning algorithm, a class from a set of classes for each row from the set of rows in the table based on (1) the locations of horizontal gaps, (2) a sequence of entity names for each row from the set of rows, and (3) a class of a row proceeding to that row;
extracting a set of table cell values associated with the set of table cells; and
generating a second electronic document including the set of table cell values arranged in the set of rows and based on the locations of horizontal gaps, such that the plurality of words in the table are computer-readable in the second electronic document.

19. The method of claim 18, further comprising:
receiving the first electronic document that is from an optical character recognition program and that includes a first page, a second page and a plurality of tables including the table.

20. The method of claim 18, wherein:
the set of classes includes at least one of Row, Partial Row, or Table End, and
the second electronic document is in a format of Comma-Separated Values (CSV), Excel, or JavaScript Object Notation (JSON).

\* \* \* \* \*